United States Patent
De Wit et al.

(10) Patent No.: US 9,506,017 B2
(45) Date of Patent: Nov. 29, 2016

(54) AQUEOUS CLEANING COMPOSITIONS INCLUDING AN ALKYL 3-HYDROXYBUTYRATE

(71) Applicant: Eastman Chemical Company, Kingsport, TN (US)

(72) Inventors: Jos Simon De Wit, Kingsport, TN (US); Mark Stanley Pavlin, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 14/685,314

(22) Filed: Apr. 13, 2015

(65) Prior Publication Data

US 2015/0218490 A1    Aug. 6, 2015

Related U.S. Application Data

(62) Division of application No. 13/957,616, filed on Aug. 2, 2013, now Pat. No. 9,163,202.

(51) Int. Cl.

| | |
|---|---|
| C11D 1/00 | (2006.01) |
| B08B 3/04 | (2006.01) |
| C11D 3/20 | (2006.01) |
| C09D 7/00 | (2006.01) |
| C09D 9/00 | (2006.01) |
| C11D 7/26 | (2006.01) |
| C11D 7/50 | (2006.01) |

(Continued)

(52) U.S. Cl.
CPC ............. *C11D 3/2093* (2013.01); *C09D 7/001* (2013.01); *C09D 9/005* (2013.01); *C11D 3/43* (2013.01); *C11D 7/266* (2013.01); *C11D 7/5022* (2013.01); *C11D 17/0017* (2013.01); *C11D 17/0021* (2013.01); *C23G 1/125* (2013.01); *C23G 1/24* (2013.01); *C23G 5/032* (2013.01)

(58) Field of Classification Search
CPC ....... C11D 1/00; C11D 3/2093; C11D 7/266; B08B 3/04
See application file for complete search history.

(56) References Cited

U.S. PATENT DOCUMENTS

| | | |
|---|---|---|
| 2,351,366 A | 6/1944 | Pohl et al. |
| 2,396,278 A | 3/1946 | Lind |

(Continued)

FOREIGN PATENT DOCUMENTS

| | | |
|---|---|---|
| EP | 1502584 A1 | 2/2005 |
| EP | 1537247 B1 | 9/2007 |

(Continued)

OTHER PUBLICATIONS

Office Action dated Jun. 4, 2015 for corresponding U.S. Appl. No. 13/957,647, 12 pages.

(Continued)

*Primary Examiner* — Brian P Mruk
(74) *Attorney, Agent, or Firm* — Hovey Williams LLP

(57) ABSTRACT

Cleaning compositions and methods of making and using the same are provided. The cleaning compositions of the present invention may include at least one alkyl 3-hydroxybutyrate and water, optionally including at least one surfactant and one or more additional additives. The cleaning compositions of the present invention, which are non-toxic and environmentally benign, can be useful to remove many types of soils from a range of different substrates in a variety of domestic, industrial, and/or institutional applications.

29 Claims, 5 Drawing Sheets

(51) Int. Cl.
*C23G 5/032* (2006.01)
*C11D 3/43* (2006.01)
*C23G 1/12* (2006.01)
*C23G 1/24* (2006.01)
*C11D 17/00* (2006.01)

(56) References Cited

U.S. PATENT DOCUMENTS

| | | |
|---|---|---|
| 2,486,921 A | 11/1949 | Byerly |
| 2,486,922 A | 11/1949 | Strain |
| 2,847,423 A | 8/1958 | Lacey |
| 3,332,880 A | 7/1967 | Kessler et al. |
| 3,513,189 A | 5/1970 | Marcus |
| 4,005,189 A | 1/1977 | Reese et al. |
| 4,994,602 A | 2/1991 | Seido et al. |
| 5,183,929 A | 2/1993 | Naito et al. |
| 5,420,335 A | 5/1995 | Birkhahn et al. |
| 5,508,435 A | 4/1996 | Armstrong, III et al. |
| 5,519,161 A | 5/1996 | Birkhahn et al. |
| 5,612,303 A | 3/1997 | Takayanagi et al. |
| 5,686,489 A | 11/1997 | Yu et al. |
| 5,693,850 A | 12/1997 | Birkhahn et al. |
| 5,800,897 A | 9/1998 | Sharma et al. |
| 5,876,621 A | 3/1999 | Sapienza |
| 5,980,774 A | 11/1999 | Sapienza |
| 6,043,063 A | 3/2000 | Kurdikar et al. |
| 6,075,154 A | 6/2000 | Gonda et al. |
| 6,083,729 A | 7/2000 | Martin et al. |
| 6,307,094 B1 | 10/2001 | Chong et al. |
| 6,492,545 B2 | 12/2002 | Saito et al. |
| 6,586,152 B1 | 7/2003 | Urano et al. |
| 6,709,848 B1 | 3/2004 | Martin et al. |
| 6,818,789 B2 | 11/2004 | Fleming et al. |
| 6,843,931 B2 | 1/2005 | Sapienza |
| 6,844,447 B2 | 1/2005 | Zhong et al. |
| 6,897,338 B2 | 5/2005 | Zhong et al. |
| 6,933,404 B2 | 8/2005 | Zhong et al. |
| 6,939,981 B1 | 9/2005 | Boaz |
| 7,001,969 B2 | 2/2006 | Zhong et al. |
| 7,057,064 B2 | 6/2006 | Proctor et al. |
| 7,166,743 B2 | 1/2007 | Zhong et al. |
| 7,230,144 B2 | 6/2007 | Zhong et al. |
| 7,419,759 B2 | 9/2008 | Kim et al. |
| 7,485,452 B2 | 2/2009 | Hwang et al. |
| 7,563,385 B2 | 7/2009 | Sapienza |
| 7,795,376 B2 | 9/2010 | Van Walsem et al. |
| 8,338,145 B2 | 12/2012 | Tsobanakis et al. |
| 8,642,654 B2 | 2/2014 | Clarke et al. |
| 2005/0221457 A1 | 10/2005 | Tsobanakis et al. |
| 2006/0078596 A1 | 4/2006 | Clarke et al. |
| 2006/0251597 A1 | 11/2006 | Van Scott et al. |
| 2007/0082832 A1 | 4/2007 | DiCosimo et al. |
| 2007/0208183 A1 | 9/2007 | Haan et al. |
| 2008/0038802 A1 | 2/2008 | Hwang et al. |
| 2008/0287538 A1 | 11/2008 | Scholz et al. |
| 2009/0298144 A1 | 12/2009 | Tsobanakis et al. |
| 2010/0119939 A1 | 5/2010 | Misumi et al. |
| 2011/0101268 A1 | 5/2011 | Choi et al. |
| 2011/0107660 A1 | 5/2011 | Chen et al. |
| 2011/0151379 A1 | 6/2011 | Choi et al. |
| 2011/0195839 A1 | 8/2011 | Schlotterbeck et al. |
| 2011/0195846 A1* | 8/2011 | Troppmann ........... A01N 47/24 504/358 |
| 2012/0064611 A1 | 3/2012 | Robertson et al. |
| 2012/0317736 A1 | 12/2012 | Gonzales et al. |
| 2013/0102663 A1 | 4/2013 | Clarke |
| 2014/0194509 A1 | 7/2014 | Clarke et al. |
| 2014/0308719 A1 | 10/2014 | Clarke et al. |
| 2015/0065571 A1 | 3/2015 | Clarke et al. |

FOREIGN PATENT DOCUMENTS

| | | |
|---|---|---|
| EP | 1601737 B1 | 10/2007 |
| FR | 2577922 A1 | 8/1986 |
| GB | 2511941 A | 9/2014 |
| JP | 2009173880 | 8/2009 |
| KR | 2006024550 A | 3/2006 |
| WO | 2011/039661 A2 | 4/2011 |
| WO | 2012039516 A1 | 3/2012 |
| WO | 2014/139599 A1 | 9/2014 |

OTHER PUBLICATIONS

LAIRD, How to Minimise Scale Up Difficulties, Chemical Industry Digest, Jul. 2010, pp. 51-56.

Wrightson et al., Safety Issues in the Scale-Up of Chemical Reactions, www.rsc.org, 2013, pp. 1-6.

Notice of Allowance dated Jun. 26, 2015 for related U.S. Appl. No. 13/957,616, filed Aug. 2, 2013, 8 pages.

Office Action dated Jul. 13, 2015 for related U.S. Appl. No. 14/694,696; 9 pages.

Lusty, C.J. et al., Poly-β-Hydroxybutyrate Depolymerases of Pseudomonas Lemoignei, Department of Bacteriology and Immunology, University of California, Berkeley, vol. 56, Jul. 12, 1966, pp. 960-965.

Notification of Transmittal of the International Search Report and the Written Opinion of the International Searching Authority with Date of Mailing Oct. 15, 2014 for International Application No. PCT/US2014/047528.

Wanfang Li, et al., RU Catalyzed Asymmetric Hydrogenation of 3-Oxoglutaric Acid Derivatives via Solvent-Assisted Pinpoint Recognition of Carbonyls in Close Chemical Propinquity, Organic Letters, 2011, vol. 13, No. 15, 3876-3879.

Sven-Olov Lawesson et al., t-Butyl Acetoacetate, Organic Syntheses, Coll. vol. 5, p. 155 (1973, vol. 42, p. 28 (1962).

Notification of Transmittal of the International Search Report and the Written Opinion of the International Searching Authority with Date of Mailing Dec. 3, 2014 for International Application No. PCT/US2014/047531.

Notification of Transmittal of the International Search Report and the Written Opinion of the International Searching Authority with Date of Mailing Dec. 3, 2014 for International Application No. PCT/US2014/047524.

Notification of Transmittal of the International Search Report and the Written Opinion of the International Searching Authority with Date of Mailing Dec. 3, 2014 for International Application No. PCT/US2014/047526.

USPTO Office Action dated Jan. 5, 2015 for co-pending U.S. Appl. No. 13/957,642.

E.I. Klabunovskii et al., Reaction Kinetics and Catalysis Letters, vol. 2, No. 3, 291-296 (1975) on the Asymmetrizing and Catalytic Activity of Ru Catalysts.

ASTM D1160-12 Aug. 14, 2013.
ASTM D7236-07 Aug. 14, 2013.
ASTM E659-78 Aug. 14, 2013.
ASTM D4052-11 Aug. 14, 2013.
ASTM D4488-95 2001 (no month given).

Vuitel et al., Etude de la reactivite de la function carbonyle avec le cetene en presence d'un alcoxyde de titane, Helvetica Chemica Acta, vol. 57, pp. 1713-1718 (1974).

Riis et al., Gas chromatograph determination of poly-β-hydroxybutyric acid in microbial biomass after hydrochloric acid propanolysis, Journal of Chromatography, vol. 445, pp. 285-289 (1988).

Adkins et al., The Hydrogenation of Acetoacetic Ester and Certain of its Derivatives Over Nickel, J.Am. Chem. Soc., vol. 52, pp. 5192-5198 (1930).

Co-pending U.S. Appl. No. 13/957,642, filed Aug. 2, 2013.
Co-pending U.S. Appl. No. 13/957,657, filed Aug. 2, 2013.
Co-pending U.S. Appl. No. 13/957,631, filed Aug. 2, 2013.

USPTO Office Action dated Apr. 16, 2014 for co-pending U.S. Appl. No. 13/957,642.

Final Office Action dated Aug. 25, 2015 in related U.S. Appl. No. 13/957,631, filed Aug. 2, 2013, 12 pages.

Advisory Action dated Sep. 1, 2015 in related U.S. Appl. No. 13/957,631, filed Aug. 2, 2013, 4 pages.

* cited by examiner

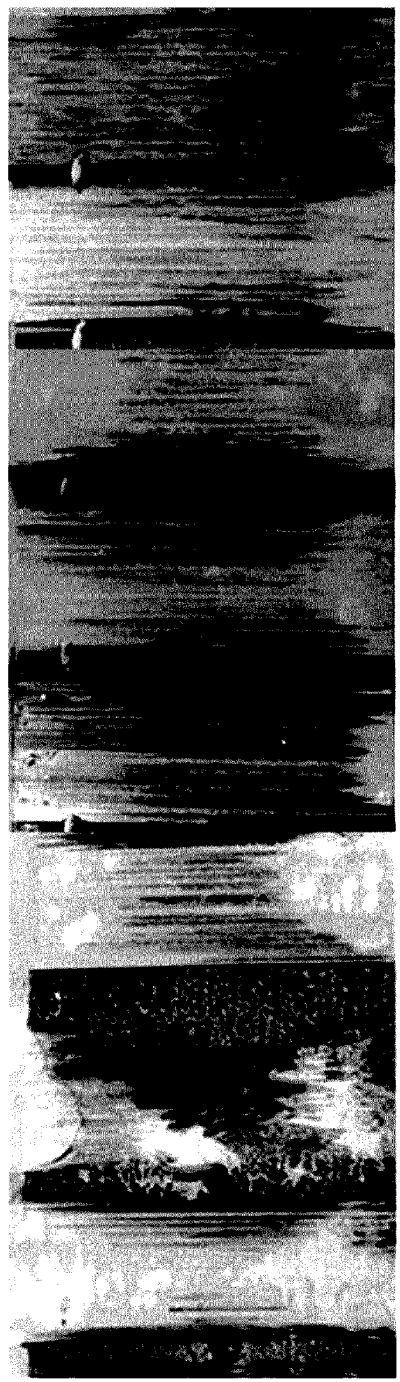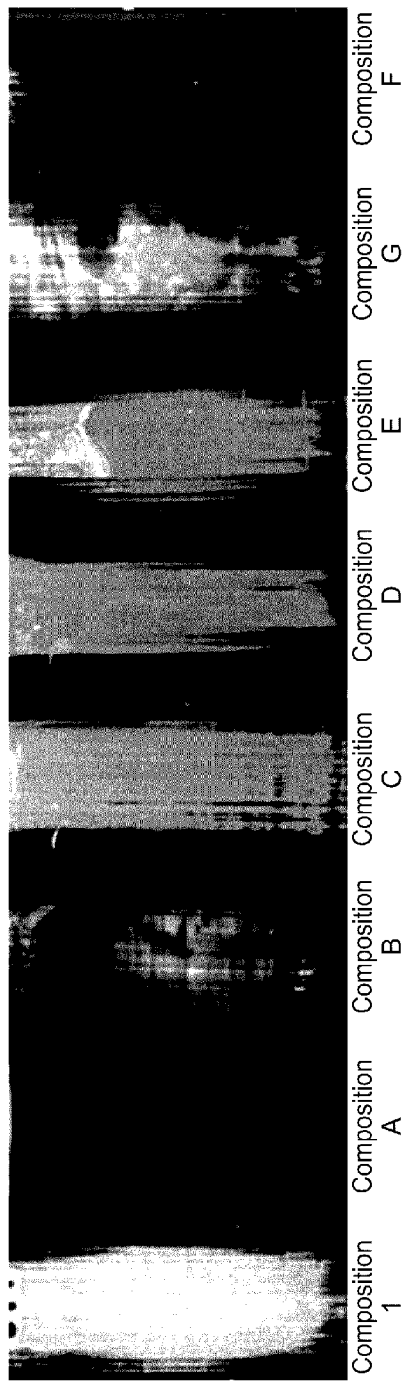

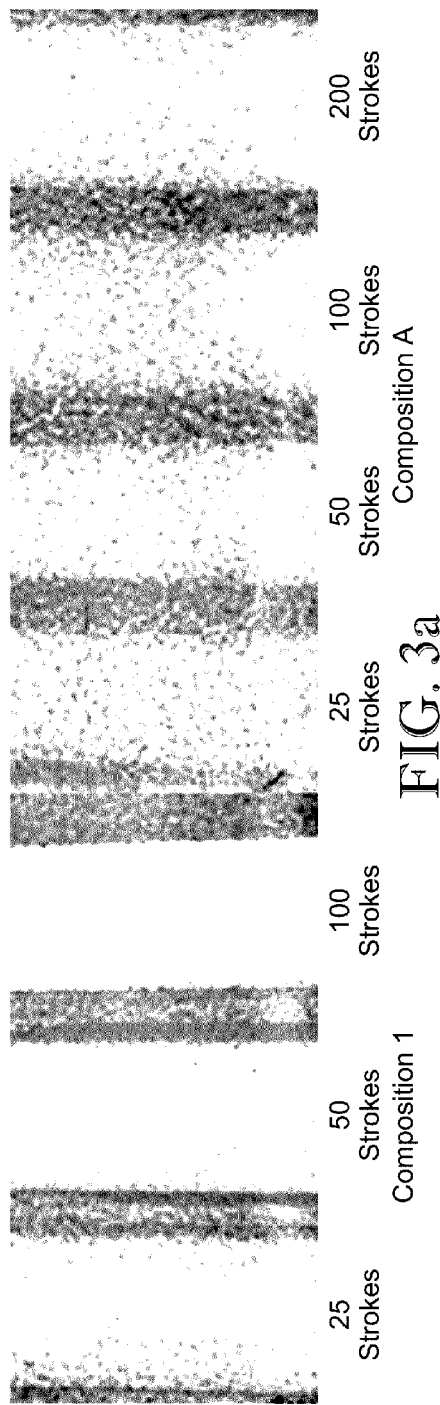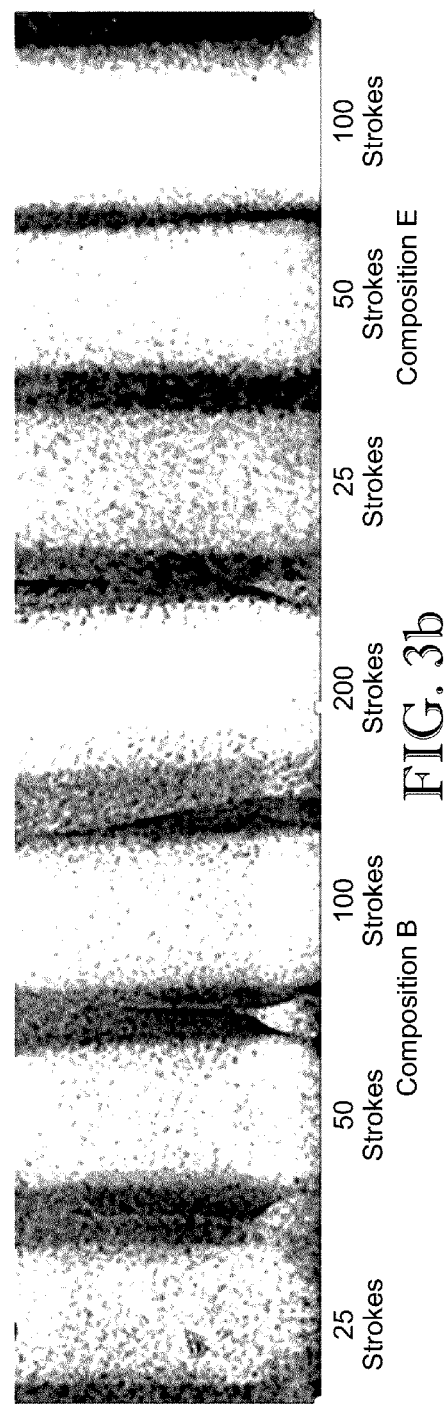

AQUEOUS CLEANING COMPOSITIONS INCLUDING AN ALKYL 3-HYDROXYBUTYRATE

CROSS REFERENCE TO RELATED APPLICATION

This application is a divisional of U.S. application Ser. No. 13/957,616, filed Aug. 2, 2013, which has issued as U.S. Pat. No. 9,163,202. The entire disclosure of the above-referenced application is incorporated herein by reference.

FIELD OF THE INVENTION

This invention relates to cleaning compositions that are useful for cleaning a variety of substrates. This invention further relates to methods of making and using such compositions.

BACKGROUND

Aqueous cleaning compositions are useful for removing dirt and other soils from a variety of surfaces including hard surfaces such as floors, walls, countertops, and furniture. Many commercially-available aqueous cleaners include an organic solvent combined with water and optional ingredients such as surfactants, colorants, fragrances, and the like. Makers of these cleaning compositions, whether for household, industrial, or institutional use, are faced with the task of optimizing the cleaning formulations by selecting a solvent that exhibits excellent cleaning performance, but that causes minimum adverse effects on the user and the environment. To date, this problem has not been successfully resolved, as most high performance cleaning compositions do not have benign toxicity profiles and/or include high VOC solvents, while many "green" cleaners, recently developed in light of stricter environmental regulations, exhibit unsatisfactory cleaning performance.

Thus, a need exists for a safe, environmentally friendly cleaning composition capable of removing soil from a substrate with high efficiency. Preferably, the cleaning composition would be effective to remove a variety of types of undesirable substances from a wide range of substrates. Further, the cleaning composition should be able to be manufactured in a cost-effective manner and on a commercial scale.

SUMMARY

In one aspect, the present invention concerns an aqueous cleaning composition comprising water and at least 0.1 weight percent of at least one alkyl 3-hydroxybutyrate defined by the following formula:

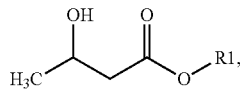

wherein R1 is an alkyl group having at least three and not more than five carbon atoms.

In another aspect, the present invention concerns a method for cleaning a substrate comprising contacting a substrate with a cleaning composition comprising water and at least one alkyl 3-hydroxybutyrate defined by the following formula:

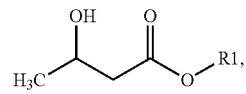

wherein R1 is an alkyl group having at least three and not more than five carbon atoms.

In yet another aspect, the present invention concerns a method for making a cleaning composition, the method comprising: combining an alkyl 3-hydroxybutyrate with water and an optional surfactant to thereby provide a cleaning mixture, wherein the alkyl group of the alkyl 3-hydroxybutyrate has at least three and not more than five carbon atoms.

BRIEF DESCRIPTION OF THE DRAWINGS

Various aspects of the present invention are described in detail below with reference to the attached drawing figures, wherein:

FIG. 1 depicts the results of a baked grease scrub test performed using several comparative and inventive cleaning compositions to remove baked grease from an aluminum panel using the method described in Example 4;

FIG. 2 depicts the results of a tar-aluminum scrub test performed using several comparative and inventive cleaning compositions to remove tar from an aluminum panel using the method described in Example 4;

FIG. 3a depicts the results of a soap scum scrub test performed using a comparative and an inventive cleaning composition to remove soap scum from a painted wall board panel using the method described in Example 4;

FIG. 3b depicts the results of a soap scum scrub test performed using several comparative cleaning compositions to remove soap scum from a painted wall board panel using the method described in Example 4;

DETAILED DESCRIPTION

Figure 3C:
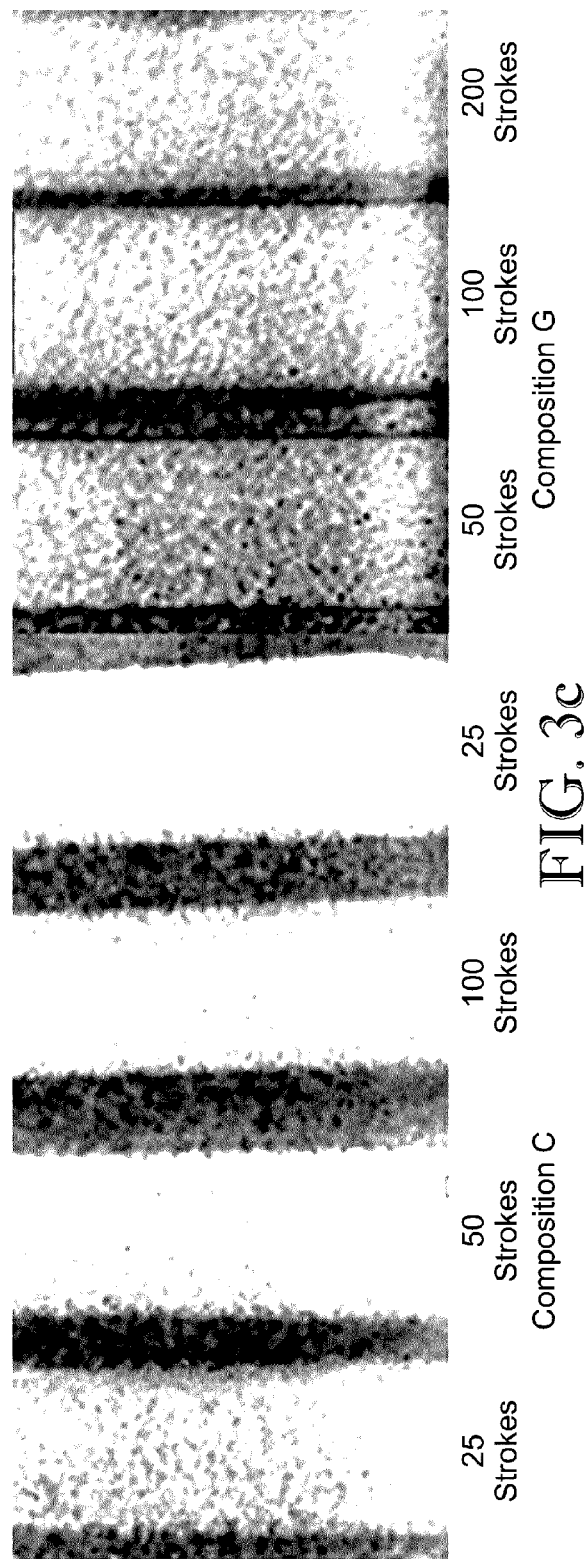
FIG. 3c depicts the results of a soap scum scrub test performed using several other comparative cleaning compositions to remove soap scum from a painted wall board panel using the method described in Example 4.

The present invention relates to aqueous cleaning compositions suitable for removing one or more soils from a substrate. As used herein, the term "soil" refers to any composition or material whose presence on a particular substrate is undesirable. Examples of soils can include, but are not limited to, dirt, tar, grease, oil, soap scum, protein, organics, enzymes, and combinations thereof. The cleaning compositions of the present invention can exhibit a high cleaning efficiency for a variety of soils and substrates, while exhibiting a benign toxicity profile and being environmentally compatible.

The cleaning compositions of the present invention can be aqueous cleaning compositions including water and at least one organic, ester-based solvent. The ester-based solvent may include at least one alkyl 3-hydroxybutyrate defined by formula (I), below:

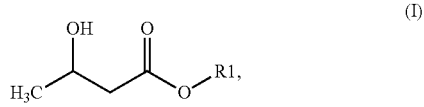

wherein R1 is an alkyl group comprising at least 3 and not more than 5 carbon atoms. As used herein, the term "alkyl group," refers to a branched or straight-chain monovalent alkyl radical. The alkyl group represented by R1 in formula (I) above may include 3 or 4 carbon atoms, or may include 4 carbon atoms. The R1 group may be selected from the group consisting of isopropyl, n-propyl, isobutyl, n-butyl, 2-butyl (sec-butyl), 2,2-dimethylethyl (tert-butyl), 3,3-dimethylpentyl (isopentyl), 1-pentyl (n-pentyl), 1-methylbutyl (2-pentyl), 2-methylbutyl, 2-ethylpropyl(3-pentyl), 1,1-dimethylpropyl, 1,2-dimethylpropyl, 2,2-dimethylpropyl (neopentyl), and cyclopentyl, or may be selected from the group consisting of isopropyl, n-propyl, isobutyl, n-butyl, and 2-butyl. In some cases, the alkyl group R1 may be selected from the group consisting of isopropyl, isobutyl, n-butyl, and 2-butyl or the group consisting of isobutyl, n-butyl, and 2-butyl. Also, the R1 group can be n-butyl. The alkyl 3-hydroxybutyrate may be present as a single enantiomer, a mixture of enantiomers enriched in one enantiomer, a single diasteriomer, a mixture enriched in one diasteriomer, or as a racemic mixture. The alkyl 3-hydroxybutyrate may be non-halogenated.

The alkyl 3-hydroxybutyrate may have a vapor pressure, measured at 20° C. via ASTM D-1160, of not more than about 0.20 torr, not more than about 0.18 torr, not more than about 0.16 torr, or not more than about 0.12 torr. In some cases, the alkyl 3-hydroxybutyrate may have a vapor pressure at 20° C. of at least about 0.05 torr, at least about 0.055 torr, at least about 0.06 torr, and/or not more than about 0.10 torr, not more than about 0.09 torr, not more than about 0.08 torr, not more than about 0.075 torr. The alkyl 3-hydroxybutyrate can have a vapor pressure, measured at 20° C., in the range of from about 0.05 to about 0.10 torr, about 0.05 to about 0.09 torr, about 0.05 to about 0.08 torr, about 0.05 to about 0.075 torr, about 0.055 to about 0.10 torr, about 0.055 to about 0.09 torr, about 0.055 to about 0.08 torr, about 0.055 to about 0.075 torr, about 0.06 to about 0.10 torr, about 0.06 to about 0.09 torr, about 0.06 to about 0.08 torr, about 0.06 to about 0.075 torr.

The alkyl 3-hydroxybutyrate may also have a boiling point, measured at atmospheric pressure using a Mettler FP81HT MBC cell equipped with photocell detection, of at least about 150° C., at least about 200° C., at least about 210° C., at least about 215° C., at least about 216° C., or at least about 217° C. and/or not more than about 230° C., not more than about 225° C., or not more than about 220° C. The boiling point of the alkyl 3-hydroxybutyrate can be in the range of from about 150 to about 230° C., about 150 to about 225° C., about 150 to about 220° C., about 200 to about 230° C., about 200 to about 225° C., about 200 to about 220° C., about 210 to about 230° C., about 210 to about 225° C., about 210 to about 220° C., about 215 to about 230° C., about 215 to about 225° C., about 215 to about 220° C., about 216 to about 230° C., about 216 to about 225° C., about 216 to about 220° C., about 217 to about 230° C., about 217 to about 225° C., about 217 to about 220° C.

The alkyl 3-hydroxybutyrate can have a flash point, measured by ASTM D7236-07 with a Setaflash closed cup instrument, of at least about 80° C., at least about 85° C., at least about 90° C., at least about 95° C. and/or not more than about 115° C., not more than about 110° C., not more than about 105° C. and/or may have an auto-ignition temperature, measured according to ASTM E659-78 (2005), of at least about 290° C., at least about 295° C., at least about 300° C. and/or not more than about 345° C., not more than about 335° C., or not more than about 330° C. The alkyl 3-hydroxybutyrate of the cleaning composition may have a flash point in the range of from about 80 to about 115° C., about 80 to about 110° C., about 80 to about 105° C., about 85 to about 115° C., about 85 to about 110° C., about 85 to about 105° C., about 90 to about 115° C., about 90 to about 110° C., about 90 to about 105° C., from about 95 to about 115° C., about 95 to about 110° C., or about 95 to about 105° C. and/or an auto-ignition temperature in the range of from about 290 to about 345° C., about 290 to about 335° C., about 290 to about 330° C., about 295 to about 345° C., about 295 to about 335° C., about 295 to about 330° C., about 300 to about 345° C., about 300 to about 335° C., or about 300 to about 330° C.

The alkyl 3-hydroxybutyrate may also have a density, measured at 20° C. using ASTM D4052-11, of at least about 0.955 g/mL, at least about 0.960 g/mL, at least about 0.965 g/mL, at least about 0.970 g/mL and/or not more than about 0.985 g/mL, not more than about 0.980 g/mL, or not more than about 0.975 g/mL. The alkyl 3-hydroxybutyrate may have a density in the range of from about 0.955 to about 0.985 g/mL, about 0.955 to about 0.980 g/mL, about 0.955 to 0.975 g/mL, 0.960 to about 0.985 g/mL, about 0.960 to about 0.980 g/mL, about 0.960 to 0.975 g/mL, 0.965 to about 0.985 g/mL, about 0.965 to about 0.980 g/mL, about 0.965 to 0.975 g/mL, 0.970 to about 0.985 g/mL, about 0.970 to about 0.980 g/mL, about 0.970 to 0.975 g/mL.

The alkyl 3-hydroxybutyrate can have a solubility limit in deionized water at 23° C. of at least about 2 weight percent, at least about 2.5 weight percent, at least about 3 weight percent, at least about 3.5 weight percent, at least about 3.75 weight percent and/or not more than about 20 weight percent, not more than about 15 weight percent, not more than about 10 weight percent, not more than about 5 weight percent. The solubility limit of the alkyl 3-hydroxybutyrate in deionized water at 23° C. can be in the range of from about 2 to about 20 weight percent, about 2 to about 15 weight percent, about 2 to about 10 weight percent, about 2 to about 5 weight percent, about 2.5 to about 20 weight percent, about 2.5 to about 15 weight percent, about 2.5 to about 10 weight percent, about 2.5 to about 5 weight percent, about 3 to about 20 weight percent, about 3 to about 15 weight percent, about 3 to about 10 weight percent, about 3 to about 5 weight percent, about 3.5 to about 20 weight percent, about 3.5 to about 15 weight percent, about 3.5 to about 10 weight percent, about 3.5 to about 5 weight percent, about 3.75 to about 20 weight percent, about 3.75 to about 15 weight percent, about 3.75 to about 10 weight percent, about 3.75 to about 5 weight percent.

The solubility limit of deionized water at 23° C. in the alkyl 3-hydroxybutyrate may be at least about 6 weight percent, at least about 8 weight percent, at least about 10 weight percent and/or not more than about 25 weight percent, not more than about 20 weight percent, not more than about 12 weight percent. The solubility limit of deionized water at 23° C. in the alkyl 3-hydroxybutyrate can be in the range of from about 6 to about 25 weight percent, about 6 to about 15 weight percent, about 6 to about 12 weight percent, about 8 to about 25 weight percent, about 8 to about 15 weight percent, about 8 to about 12 weight percent, about 10 to about 25 weight percent, about 10 to about 15 weight percent, about 10 to about 12 weight percent.

Additionally, the alkyl 3-hydroxybutyrate may be described by one or more of the following Hansen solubility parameters. For example, the alkyl 3-hydroxybutyrate may have a Hansen polar solubility parameter ($\sigma_p$ or "P parameter") of at least about 2.50 $(cal/cm^3)^{1/2}$, at least about 2.75 $(cal/cm^3)^{1/2}$, at least about 2.80 $(cal/cm^3)^{1/2}$, at least about 2.95 $(cal/cm^3)^{1/2}$, at least about 3.00 $(cal/cm^3)^{1/2}$, at least about 3.10 $(cal/cm^3)^{1/2}$ and/or not more than about 3.4 $(cal/cm^3)^{1/2}$, not more than about 3.30 $(cal/cm^3)^{1/2}$, not more than about 3.25 $(cal/cm^3)^{1/2}$, calculated using the "Hansen Solubility Parameters in Practice" software package $3^{rd}$ ed., version 3.1, by S. Abbott and C. Hansen.

The Hansen polar solubility parameter, which measures the permanent dipole moment and permanent dipole interactions of a molecule, can be in the range of from about 2.5 to about 3.4 $(cal/cm^3)^{1/2}$, about 2.5 to about 3.3 $(cal/cm^3)^{1/2}$, about 2.5 to about 3.25 $(cal/cm^3)^{1/2}$, 2.75 to about 3.4 $(cal/cm^3)^{1/2}$, about 2.75 to about 3.3 $(cal/cm^3)^{1/2}$, about 2.75 to about 3.25 $(cal/cm^3)^{1/2}$, 2.8 to about 3.4 $(cal/cm^3)^{1/2}$, about 2.8 to about 3.3 $(cal/cm^3)^{1/2}$, about 2.8 to about 3.25 $(cal/cm^3)^{1/2}$, 2.95 to about 3.4 $(cal/cm^3)^{1/2}$, about 2.95 to about 3.3 $(cal/cm^3)^{1/2}$, about 2.95 to about 3.25 $(cal/cm^3)^{1/2}$, 3.0 to about 3.4 $(cal/cm^3)^{1/2}$, about 3.0 to about 3.3 $(cal/cm^3)^{1/2}$, about 3.0 to about 3.25 $(cal/cm^3)^{1/2}$, 3.1 to about 3.4 $(cal/cm^3)^{1/2}$, about 3.1 to about 3.3 $(cal/cm^3)^{1/2}$, about 3.1 to about 3.25 $(cal/cm^3)^{1/2}$ for the alkyl 3-hydroxybutyrate.

The alkyl 3-hydroxybutyrate can have a Hansen hydrogen bonding solubility parameter ($\sigma_h$ or "H parameter") of at least about 5.40 $(cal/cm^3)^{1/2}$, at least about 5.40 $(cal/cm^3)^{1/2}$, at least about 5.60 $(cal/cm^3)^{1/2}$, at least about 5.65 $(cal/cm^3)^{1/2}$, at least about 5.70 $(cal/cm^3)^{1/2}$ and/or not more than about 6.10 $(cal/cm^3)^{1/2}$, not more than about 5.95 $(cal/cm^3)^{1/2}$, not more than about 5.90 $(cal/cm^3)^{1/2}$, not more than about 5.85 $(cal/cm^3)^{1/2}$, calculated as described above.

The Hansen hydrogen bonding solubility parameter, which measures electron exchange, can be in the range of from about 5.40 to about 6.10 $(cal/cm^3)^{1/2}$, about 5.40 to about 5.95 $(cal/cm^3)^{1/2}$, about 5.40 to about 5.90 $(cal/cm^3)^{1/2}$, about 5.40 to about 5.85 $(cal/cm^3)^{1/2}$ about 5.60 to about 6.10 $(cal/cm^3)^{1/2}$, about 5.60 to about 5.95 $(cal/cm^3)^{1/2}$, about 5.60 to about 5.90 $(cal/cm^3)^{1/2}$, about 5.60 to about 5.85 $(cal/cm^3)^{1/2}$, about 5.65 to about 6.10 $(cal/cm^3)^{1/2}$, about 5.65 to about 5.95 $(cal/cm^3)^{1/2}$, about 5.65 to about 5.90 $(cal/cm^3)^{1/2}$, about 5.65 to about 5.85 $(cal/cm^3)^{1/2}$, about 5.70 to about 6.10 $(cal/cm^3)^{1/2}$, about 5.70 to about 5.95 $(cal/cm^3)^{1/2}$, about 5.70 to about 5.90 $(cal/cm^3)^{1/2}$, about 5.70 to about 5.85 $(cal/cm^3)^{1/2}$ for the alkyl 3-hydroxybutyrate.

The alkyl 3-hydroxybutyrate can have a Hansen dispersion solubility parameter ($\sigma_d$ or "D parameter") of at least about 7.50 $(cal/cm^3)^{1/2}$, at least about 7.75 $(cal/cm^3)^{1/2}$, at least about 8.00 $(cal/cm^3)^{1/2}$, at least about 8.03 $(cal/cm^3)^{1/2}$ and/or not more than about 8.15 $(cal/cm^3)^{1/2}$, not more than about 8.10 $(cal/cm^3)^{1/2}$, not more than about 8.05 $(cal/cm^3)^{1/2}$, not more than about 8.00 $(cal/cm^3)^{1/2}$, calculated as described above.

The Hansen dispersion solubility parameter, which measures nonpolar interactions derived from atomic forces, of the alkyl 3-hydroxybutyrate can be in the range of from about 7.50 to about 8.15 $(cal/cm^3)^{1/2}$, about 7.50 to about 8.10 $(cal/cm^3)^{1/2}$, about 7.50 to about 8.05 $(cal/cm^3)^{1/2}$, about 7.50 to about 8.0 $(cal/cm^3)^{1/2}$, about 7.75 to about 8.15 $(cal/cm^3)^{1/2}$, about 7.75 to about 8.10 $(cal/cm^3)^{1/2}$, about 7.75 to about 8.05 $(cal/cm^3)^{1/2}$, about 7.75 to about 8.0 $(cal/cm^3)^{1/2}$, about 8.0 to about 8.15 $(cal/cm^3)^{1/2}$, about 8.0 to about 8.10 $(cal/cm^3)^{1/2}$, about 8.0 to about 8.05 $(cal/cm^3)^{1/2}$, about 8.03 to about 8.15 $(cal/cm^3)^{1/2}$, about 8.03 to about 8.10 $(cal/cm^3)^{1/2}$, about 8.03 to about 8.05 $(cal/cm^3)^{1/2}$.

The alkyl 3-hydroxybutyrate can have a total Hansen solubility parameter of at least about 10.1 $(cal/cm^3)^{1/2}$, at least about 10.2 $(cal/cm^3)^{1/2}$, at least about 10.25 $(cal/cm^3)^{1/2}$, at least about 10.3 $(cal/cm^3)^{1/2}$ and/or not more than about 10.5 $(cal/cm^3)^{1/2}$, not more than about 10.45 $(cal/cm^3)^{1/2}$, not more than about 10.40 $(cal/cm^3)^{1/2}$, calculated as described above. The total Hansen solubility parameter of the alkyl 3-hydroxybutyrate can be in the range of from about 10.1 to about 10.5 $(cal/cm^3)^{1/2}$, about 10.1 to about 10.45 $(cal/cm^3)^{1/2}$, about 10.1 to about 10.40 $(cal/cm^3)^{1/2}$, about 10.2 to about 10.5 $(cal/cm^3)^{1/2}$, about 10.2 to about 10.45 $(cal/cm^3)^{1/2}$, about 10.2 to about 10.40 $(cal/cm^3)^{1/2}$, about 10.25 to about 10.5 $(cal/cm^3)^{1/2}$, about 10.25 to about 10.45 $(cal/cm^3)^{1/2}$, about 10.25 to about 10.40 $(cal/cm^3)^{1/2}$, about 10.3 to about 10.5 $(cal/cm^3)^{1/2}$, about 10.3 to about 10.45 $(cal/cm^3)^{1/2}$, about 10.3 to about 10.40 $(cal/cm^3)^{1/2}$.

The alkyl 3-hydroxybutyrate can have a surface tension, measured using the ring pull method with a Krüss K100 tensiometer, of at least about 24.5 dynes/cm, at least about 25.0 dynes/cm, at least about 25.5 dynes/cm, and/or not more than about 30 dynes/cm, not more than about 29 dynes/cm, not more than about 28 dynes/cm, not more than about 27 dynes/cm, not more than about 26.5 dynes/cm. The surface tension of the alkyl 3-hydroxybutyrate can be in the range of from about 24.5 to about 30 dynes/cm, about 24.5 to about 29 dynes/cm, about 24.5 to about 28 dynes/com, about 24.5 to about 27 dynes/cm, about 24.5 to about 26.5 dynes/cm, about 25 to about 30 dynes/cm, about 25 to about 29 dynes/cm, about 25 to about 28 dynes/com, about 25 to about 27 dynes/cm, about 25 to about 26.5 dynes/cm, about 25.5 to about 30 dynes/cm, about 25.5 to about 29 dynes/cm, about 25.5 to about 28 dynes/com, about 25.5 to about 27 dynes/cm, about 25.5 to about 26.5 dynes/cm.

The alkyl 3-hydroxybutyrate may also have the ability to bring together and homogenize two immiscible liquids, for example, an oil and water. This ability is called "coupling efficiency" and can be measured by adding the alkyl 3-hydroxybutyrate to 1.0 gram of an oil and 1.0 gram of deionized water with vigorous stirring or shaking until the mixture becomes clear. The result can then be expressed as the number of grams of solvent divided by the total grams of oil and water. The alkyl 3-hydroxybutyrate can have a corn oil-water coupling efficiency measured at 23° C. of at least about 5 grams of alkyl 3-hydroxybutyrate per total grams of oil and water (g/g), at least about 6 g/g, at least about 7 g/g and/or not more than about 15 g/g, not more than about 12 g/g, or not more than about 10 g/g. The alkyl 3-hydroxybutyrate may also have a corn oil-water coupling efficiency in the range of from about 5 to about 15 g/g, about 5 to about 12 g/g, about 5 to about 10 g/g, about 6 to about 15 g/g, about 6 to about 12/g/g, about 6 to about 10 g/g, about 7 to about 15 g/g, about 7 to about 12 g/g, about 7 to about 10 g/g.

The alkyl 3-hydroxybutyrate can originate from any suitable source and/or can be synthesized by any suitable method. It may, for example, originate from a biological source and be obtained by alcoholysis of a poly-3-hydroxybutyrate (PHB) extracted from plant matter or other biological materials. It may be synthesized directly by esterification of 3-hydroxybutyric acid or by transesterification of a different 3-hydroxybutric acid ester, for example, methyl 3-hydroxybutyrate, and an alkanol in the presence of an aprotic catalyst, for example, a dialkyl tin oxide.

It may also be synthesized by reducing an alkyl acetoacetate, for example, in the presence of hydrogen and a hydrogenation catalyst at a temperature of at least about 70° C., at least about 75° C., or at least about 80° C. and/or not more than about 110° C., not more than about 105° C., or not more than about 95° C. The temperature of hydrogenation may be in the range of from about 70° C. to about 110° C., about 70° C. to about 105° C., about 70° C. to about 95° C., about 75° C. to about 110° C., about 75° C. to about 105° C., about 75° C. to about 95° C., about 80° C. to about 110° C., about 80° C. to about 105° C., about 80° C. to about 95° C. The hydrogenation pressure may be at least about 700 psig, at least about 750 psig, at least about 800 psig and/or not more than about 1200 psig, not more than about 1000 psig, or not more than about 900 psig, or in the range of from about 700 to about 1200 psig, about 700 to about 1000 psig, about 700 to about 900 psig, about 750 to about 1200 psig, about 750 to about 1000 psig, about 750 to about 900 psig, about 800 to about 1200 psig, about 800 to about 1000 psig, about 800 to about 900 psig.

The cleaning composition of the present invention may include at least 0.1 weight percent of the alkyl 3-hydroxybutyrate, based on the total weight of the composition. The alkyl 3-hydroxybutyrate may also be present in an amount of at least about 0.5 weight percent, at least about 1 weight percent, at least about 2 weight percent, at least about 3 weight percent, at least about 4 weight percent, at least about 5 weight percent and/or not more than about 99 weight percent, not more than about 90 weight percent, not more than about 80 weight percent, not more than about 70 weight percent, not more than about 60 weight percent, not more than about 50 weight percent, not more than about 40 weight percent, not more than about 30 weight percent, not more than about 20 weight percent, not more than about 15 weight percent, not more than about 10 weight percent, not more than about 5 weight percent, not more than about 4 weight percent, based on the total weight of the composition.

The alkyl 3-hydroxybutyrate can be present in the cleaning composition in an amount in the range of from about 0.1 to about 99 weight percent, about 0.1 to about 90 weight percent, about 0.1 to about 80 weight percent, about 0.1 to about 70 weight percent, about 0.1 to about 60 weight percent, about 0.1 to about 50 weight percent, about 0.1 to about 40 weight percent, about 0.1 to about 30 weight percent, about 0.1 to about 20 weight percent, about 0.1 to about 15 weight percent, about 0.1 to about 10 weight percent, about 0.1 to about 5 weight percent, about 0.1 to about 4 weight percent, about 0.5 to about 99 weight percent, about 0.5 to about 90 weight percent, about 0.5 to about 80 weight percent, about 0.5 to about 70 weight percent, about 0.5 to about 60 weight percent, about 0.5 to about 50 weight percent, about 0.5 to about 40 weight percent, about 0.5 to about 30 weight percent, about 0.5 to about 20 weight percent, about 0.5 to about 15 weight percent, about 0.5 to about 10 weight percent, about 0.5 to about 5 weight percent, about 0.5 to about 4 weight percent, about 1 to about 99 weight percent, about 1 to about 90 weight percent, about 1 to about 80 weight percent, about 1 to about 70 weight percent, about 1 to about 60 weight percent, about 1 to about 50 weight percent, about 1 to about 40 weight percent, about 1 to about 30 weight percent, about 1 to about 20 weight percent, about 1 to about 15 weight percent, about 1 to about 10 weight percent, about 1 to about 5 weight percent, about 1 to about 4 weight percent, about 2 to about 99 weight percent, about 2 to about 90 weight percent, about 2 to about 80 weight percent, about 2 to about 70 weight percent, about 2 to about 60 weight percent, about 2 to about 50 weight percent, about 2 to about 40 weight percent, about 2 to about 30 weight percent, about 2 to about 20 weight percent, about 2 to about 15 weight percent, about 2 to about 10 weight percent, about 2 to about 5 weight percent, about 2 to about 4 weight percent, about 3 to about 99 weight percent, about 3 to about 90 weight percent, about 3 to about 80 weight percent, about 3 to about 70 weight percent, about 3 to about 60 weight percent, about 3 to about 50 weight percent, about 3 to about 40 weight percent, about 3 to about 30 weight percent, about 3 to about 20 weight percent, about 3 to about 15 weight percent, about 3 to about 10 weight percent, about 3 to about 5 weight percent, about 3 to about 4 weight percent, about 4 to about 99 weight percent, about 4 to about 90 weight percent, about 4 to about 80 weight percent, about 4 to about 70 weight percent, about 4 to about 60 weight percent, about 4 to about 50 weight percent, about 4 to about 40 weight percent, about 4 to about 30 weight percent, about 4 to about 20 weight percent, about 4 to about 15 weight percent, about 4 to about 10 weight percent, about 4 to about 5 weight percent, about 5 to about 99 weight percent, about 5 to about 90 weight percent, about 5 to about 80 weight percent, about 5 to about 70 weight percent, about 5 to about 60 weight percent, about 5 to about 50 weight percent, about 5 to about 40 weight percent, about 5 to about 30 weight percent, about 5 to about 20 weight percent, about 5 to about 15 weight percent, or about 5 to about 10 weight percent, based on the total weight of the composition. The amount of the alkyl 3-hydroxybutyrate used in the cleaning composition may depend, in part, on the specific application, the type of substrate being cleaned, and/or type of soil being removed.

The water may be present in the aqueous cleaning composition in an amount of at least about 30 weight percent, at least about 35 weight percent, at least about 40 weight percent, at least about 45 weight percent, at least about 50 weight percent, at least about 55 weight percent, at least about 60 weight percent, at least about 65 weight percent, at least about 70 weight percent, at least about 75 weight percent, and/or not more than about 99.9 weight percent, not more than about 95 weight percent, not more than about 90 weight percent, not more than about 85 weight percent, not more than about 80 weight percent, based on the total weight of the cleaning composition.

Water may be present in the cleaning composition in an amount in the range of from about 30 to about 99.9 weight percent, about 30 to about 95 weight percent, about 30 to about 90 weight percent, about 30 to about 85 weight percent, about 30 to about 80 weight percent, 35 to about 99.9 weight percent, about 35 to about 95 weight percent, about 35 to about 90 weight percent, about 35 to about 85 weight percent, about 35 to about 80 weight percent, 40 to about 99.9 weight percent, about 40 to about 95 weight percent, about 40 to about 90 weight percent, about 40 to about 85 weight percent, about 40 to about 80 weight percent, 45 to about 99.9 weight percent, about 45 to about 95 weight percent, about 45 to about 90 weight percent, about 45 to about 85 weight percent, about 45 to about 80 weight percent, about 50 to about 99.9 weight percent, about 50 to about 95 weight percent, about 50 to about 90 weight percent, about 50 to about 85 weight percent, about 50 to about 80 weight percent, about 55 to about 99.9 weight percent, about 55 to about 95 weight percent, about 55 to about 90 weight percent, about 55 to about 85 weight percent, about 55 to about 80 weight percent, about 60 to about 99.9 weight percent, about 60 to about 95 weight percent, about 60 to about 90 weight percent, about 60 to about 85 weight percent, about 60 to about 80 weight percent, about 65 to about 99.9 weight percent, about 65 to about 95 weight percent, about 65 to about 90 weight percent, about 65 to about 85 weight percent, about 65 to about 80 weight percent, about 70 to about 99.9 weight percent, about 70 to about 95 weight percent, about 70 to about 90 weight percent, about 70 to about 85 weight percent, about 70 to about 80 weight percent, based on the total weight of the composition.

The ratio, by weight, of alkyl 3-hydroxybutyrate to water in the cleaning composition may be at least about 0.001:1, at least about 0.002:1, at least about 0.005:1, at least about 0.010:1 at least about 0.020:1 and/or not more than about 0.50:1, not more than about 0.25:1, not more than about 0.20:1, not more than about 0.10:1, not more than about 0.05:1, not more than about 0.035:1, or in the range of from about 0.001:1 to about 0.50:1, about 0.001:1 to about 0.25:1, about 0.001:1 to about 0.20:1, about 0.001:1 to about 0.10:1, about 0.001:1 to about 0.05:1, about 0.001:1 to about 0.035:1, about 0.002:1 to about 0.50:1, about 0.002:1 to about 0.25:1, about 0.002:1 to about 0.20:1, about 0.002:1 to about 0.10:1, about 0.002:1 to about 0.05:1, about 0.002:1 to about 0.035:1, about 0.005:1 to about 0.50:1, about 0.005:1 to about 0.25:1, about 0.005:1 to about 0.20:1, about 0.005:1 to about 0.10:1, about 0.005:1 to about 0.05:1, about 0.005:1 to about 0.035:1, about 0.010:1 to about 0.50:1, about 0.010:1 to about 0.25:1, about 0.010:1 to about 0.20:1, about 0.010:1 to about 0.10:1, about 0.010:1 to about 0.05:1, about 0.010:1 to about 0.035:1, about 0.020:1 to about 0.50:1, about 0.020:1 to about 0.25:1, about 0.020:1 to about 0.20:1, about 0.020:1 to about 0.10:1, about 0.020:1 to about 0.05:1, about 0.020:1 to about 0.035:1.

The water may be any type of water suitable for use in a cleaning composition and can originate from several sources. For example, the water can include tap water, filtered water, bottled water, spring water, distilled water, deionized water, and/or industrial soft water. If the water is hard water comprising organics and/or dissolved mineral salts or metals, it may be purified to remove all or at least a portion of these components, which may interfere with the operation of the other components of the cleaning composition.

The cleaning composition may include not more than about 10 weight percent, not more than about 8 weight percent, not more than about 5 weight percent, not more than about 2 weight percent, not more than about 1 weight percent, not more than about 0.5 weight percent, not more than about 0.1 weight percent of components other than water and the alkyl 3-hydroxybutyrate, based on the total weight of all ingredients in the composition. In other cases, the composition may consist essentially of water and the alkyl 3-hydroxybutyrate. The alkyl 3-hydroxybutyrate may be present in the cleaning composition in an amount of not more than about 5 weight percent, not more than about 4.5 weight percent, or not more than about 4 weight percent, based on the total weight of the composition. The cleaning composition may comprise not more than about 10 weight percent, not more than about 8 weight percent, not more than about 6 weight percent, not more than about 5 weight percent, not more than about 4 weight percent, not more than about 3 weight percent, not more than about 2 weight percent, not more than about 1 weight percent, not more than about 0.5 weight percent of one or more components having a vapor pressure greater than about 0.10 torr measured at 20° C.

Cleaning compositions of the present invention may also include at least one surfactant. As used herein, the term "surfactant," refers to a compound that reduces surface tension when dissolved in water or water solutions or that reduces the interfacial tension between two liquids or between a liquid and a solid. The surfactant, when present alone or as a system comprising two or more surfactants, may be included in the cleaning composition in an amount of at least about 0.01 weight percent, at least about 0.05 weight percent, at least about 1 weight percent, at least about 1.5 weight percent, at least about 2 weight percent and/or not more than about 15 weight percent, not more than about 10 weight percent, not more than about 8 weight percent, not more than about 6 weight percent, not more than about 4 weight percent, based on the total weight of the composition.

The surfactant may be present in the composition in an amount in the range of about 0.01 weight percent to about 15 weight percent, about 0.01 to about 10 weight percent, about 0.01 to about 8 weight percent, about 0.01 to about 6 weight percent, about 0.01 to about 4 weight percent, about 0.05 to about 15 weight percent, about 0.05 to about 10 weight percent, about 0.05 to about 8 weight percent, about 0.05 to about 6 weight percent, about 0.05 to about 4 weight percent, about 1 to about 15 weight percent, about 1 to about 10 weight percent, about 1 to about 8 weight percent, about 1 to about 6 weight percent, about 1 to about 4 weight percent, about 1.5 to about 15 weight percent, about 1.5 to about 10 weight percent, about 1.5 to about 8 weight percent, about 1.5 to about 6 weight percent, about 1.5 to about 4 weight percent, about 2 to about 15 weight percent, about 2 to about 10 weight percent, about 2 to about 8 weight percent, about 2 to about 6 weight percent, about 2 to about 4 weight percent, based on the total weight of the composition.

The ratio, by weight, of the alkyl 3-hydroxybutyrate to surfactant in the cleaning composition may be at least about 0.01:1, at least about 0.05:1, at least about 0.10:1, at least about 0.5:1 and/or not more than about 150:1, not more than about 100:1, not more than about 50:1, not more than about 25:1, not more than about 10:1, not more than about 5:1, or in the range of from about 0.01:1 to about 150:1, about 0.01:1 to about 100:1, about 0.01:1 to about 50:1, about 0.01:1 to about 25:1, about 0.01:1 to about 10:1, about 0.01:1 to about 5:1, about 0.05:1 to about 150:1, about 0.05:1 to about 100:1, about 0.05:1 to about 50:1, about 0.05:1 to about 25:1, about 0.05:1 to about 10:1, about 0.05:1 to about 5:1, about 0.10:1 to about 150:1, about 0.10:1 to about 100:1, about 0.10:1 to about 50:1, about 0.10:1 to about 25:1, about 0.10:1 to about 10:1, about 0.10:1 to about 5:1, about 0.5:1 to about 150:1, about 0.5:1 to about 100:1, about 0.5:1 to about 50:1, about 0.5:1 to about 25:1, about 0.5:1 to about 10:1, about 0.5:1 to about 5:1.

The ratio, by weight, of alkyl 3-hydroxybutyrate to the total amount of water and surfactant in the cleaning composition can be at least about 0.001:1, at least about 0.002:1, at least about 0.005:1, at least about 0.010:1 and/or not more than about 0.25:1, not more than about 0.10:1, not more than about 0.05:1, or in the range of from about 0.001:1 to about 0.25:1, about 0.001:1 to about 0.10:1, about 0.001:1 to about 0.05:1, about 0.002:1 to about 0.25:1, about 0.002:1 to about 0.10:1, about 0.002:1 to about 0.05:1, about 0.005:1 to about 0.25:1, about 0.005:1 to about 0.10:1, about 0.005:1 to about 0.05:1, about 0.010:1 to about 0.25:1, about 0.010:1 to about 0.10:1, about 0.010:1 to about 0.05:1.

The surfactant can be nonionic, cationic, anionic, amphoteric, or zwitterionic. When two or more surfactants are present in the cleaning composition, at least one of the surfactants may be of a different type than one or more of the other surfactants. Alternatively, all of the surfactants in a system comprising two or more surfactants can be of the same type. The surfactant can have a hydrophilic-lipophilic balance (HLB) value of at least about 3, at least about 4, at least about 5, at least about 6, at least about 7, at least about 8 and/or not more than about 19, not more than about 18, or not more than about 17, not more than about 16, not more than about 15, not more than about 14, as determined by Griffin's Method. The HLB value of the surfactant can be in the range of from about 3 to about 19, about 3 to about 18, about 3 to about 17, about 3 to about 16, about 3 to about 15, about 3 to about 14, about 4 to about 19, about 4 to about 18, about 4 to about 17, about 4 to about 16, about 4 to about 15, about 4 to about 14, about 5 to about 19, about 5 to about 18, about 5 to about 17, about 5 to about 16, about 5 to about 15, about 5 to about 14, about 6 to about 19, about 6 to about 18, about 6 to about 17, about 6 to about 16, about 6 to about 15, about 6 to about 14, about 7 to about 19, about 7 to about 18, about 7 to about 17, about 7 to about 16, about 7 to about 15, about 7 to about 14, about 8 to about 19, about 8 to about 18, about 8 to about 17, about 8 to about 16, about 8 to about 15, about 8 to about 14. A list of HLB values for a variety of suitable surfactants is available in *McCutcheon's Emulsifiers & Detergents*, North American and International Edition, MC Publishing Company, 1993. The HLB value of a particular surfactant may be a function of its ionic nature.

The surfactant may comprise a nonionic surfactant. Examples of nonionic surfactants include, but are not limited to, alkyl polyglucosides, fatty alcohols, glycols, glycol esters, alkyl carboxylic acid esters, alcohol alkoxylates, alkyl phenol alkoxylates, nonylphenol ethoxylates, alkyl ethanolamides, amine oxides, terpene alkoxylates, or combinations thereof. Some additional examples of nonionic surfactants include ethoxylated alkanolamides, ethylene bisamides, fatty acid esters, glycerol esters, ethoxylated fatty acid esters, sorbitan esters, ethoxylated sorbitan, tristyrylphenol ethoxylates, mercaptan ethoxylates, end-capped and EO/PO block copolymers such as ethylene oxide/propylene oxide block copolymers, chlorine capped ethoxylates, tetrafunctional block copolymers, lauramine oxide, cocamine oxide, stearamine oxide, stearamidopropylamine oxide, palmitamidopropylamine oxide, decylamine oxide, decyl alcohol, lauryl alcohol, tridecyl alcohol, myristyl alcohol, cetyl alcohol, stearyl alcohol, oleyl alcohol, linoleyl alcohol and linolenyl alcohol, ethoxylated lauryl alcohol, trideceth alcohols, lauric acid, oleic acid, stearic acid, myristic acid, cetearic acid, isostearic acid, linoleic acid, linolenic acid, ricinoleic acid, elaidic acid, arichidonic acid, myristoleic acid, and combinations thereof. The nonionic surfactant may also comprise a glycol such as polyethylene glycol, polypropylene glycol or derivatives thereof and/or one or more alkyl polyethylene glycol esters.

Further examples of nonionic surfactants can include, but are not limited to, substituted aliphatic or aromatic alcohol ethoxylates, beta-alkyloxy alkane sulfonates, phenol ethoxylates or alkylphenol ethoxylates. Other nonionic surfactants can include ethoxylated tallow alkyl amine (polyoxyethylene tallow amine), commercially available as GENAMIN T 150M from Clariant Corp. or as MILSTAT N-20 from ICI Americas or an ethoxylated coco alkyl amine (polyoxyethylene coco amine), commercially available as ETHOMEEN C/25 from Akzo Nobel.

Additionally, the surfactant utilized in the inventive cleaning composition can comprise one or more nonionic surfactants formed from a mixture of polyethoxylated alkanol of the general formula: $CH_3(CH_2)_m—(O—CH_2—CH_2)_n—OH$ wherein m is an integer from 8 to 12 and n represents an average degree of ethoxylation for the mixture, which can be at least about 2 moles, at least about 3 moles, at least about 4 moles and/or not more than about 8 moles, not more than about 7 moles, not more than about 6 moles. Examples of these types of surfactants can include NEODOL™ ethoxylates, commercially available from Shell Company, USA, which include higher aliphatic, a primary alcohol containing between 9 and 11 carbon atoms (i.e., a $C_9$-$C_{11}$ alkanol), condensed with between 2.5 and 10 moles of ethylene oxide (e.g., NEODOL™ 91-2.5, NEODOL™ 91-5, NEODOL™ 91-6), a NEODOL™ 91-8), a $C_{12}$-15 alkanol condensed with 6.5 moles ethylene oxide (NEODOL™ 23-6.5), $C_{12}$-$C_{15}$ alkanol condensed with 12 moles ethylene oxide (e.g., NEODOL™ 25-12), a $C_{14}$-$C_{15}$ alkanol condensed with 13 moles ethylene oxide (e.g., NEODOL™ 45-13), a $C_{14}$-$C_{15}$ alkanol condensed with about 7 moles of ethylene oxide (e.g., NEODOL™ 45-7) and the like.

Still other suitable nonionic surfactants are those derived from $C_{11}$-$C_{15}$ secondary alkanols by reaction with either 9 moles of ethylene oxide (e.g., Tergitol™ 15-S-9) or 12 moles of ethylene oxide (e.g., Tergitol™ 15-S-12), both of which are commercially available from Union Carbide/Dow Chemical. Other examples of nonionic surfactants include the alkyl phenol ethoxylates including nonyl phenol condensed with between 3 and 9.5 moles of ethylene oxide per mole of nonyl phenol; dinonyl phenol condensed with 12 moles of ethylene oxide per mole of phenol; dinonyl phenol condensed with 15 moles of ethylene oxide per mole of phenol and di-isoctylphenol condensed with 15 moles of ethylene oxide per mole of phenol. Such surfactants are commercially available as Igepal™ CO-630 nonyl phenol ethoxylate available from Rhodia, Inc. (La Defense, France).

Additional nonionic surfactants which may be used include condensation products of a $C_8$-$C_{20}$ alkanol with a mixture of ethylene oxide and propylene oxide may also be used. The weight ratio of ethylene oxide to propylene oxide can be about 2.5:1 to about 4:1 or about 2.8:1 to about 3.3:1, with the total of the ethylene oxide and propylene oxide (including the terminal ethanol or propanol group) being at least about 60 percent, at least about 70 percent and/or not more than about 85 percent, not more than about 80 percent. Such surfactants are commercially available from BASF-Wyandotte (Michigan, USA). Further, other suitable nonionic surfactants include the condensates of between 2 and 30 moles of ethylene oxide with sorbitan mono- and tri-$C_{10}$-$C_{20}$ alkanoic acid esters. These types of surfactants are commercially available under the TWEEN trade name from Imperial Chemical Industries (London, UK).

Further examples of suitable surfactants include, but are not limited to, polyoxyethylene (4) sorbitan monolaurate, polyoxyethylene (4) sorbitan monostearate, polyoxyethylene (20) sorbitan trioleate and polyoxyethylene (20) sorbitan tristearate and compounds formed by condensing ethylene oxide with a hydrophobic base, which is formed by the condensation of propylene oxide with propylene glycol. The molecular weight of the hydrophobic portion of the molecule is at least about 950 g/mol, at least about 1500 g/mol and/or not more than about 4000 g/mol, not more than about 2500 g/mol, or in the range of from about 950 to about 4000 g/mol, about 950 to about 2500 g/mol, about 1500 to about 4000 g/mol or 1500 to 2500 g/mol, and the addition of polyoxyethylene radicals to the hydrophobic portion tends to increase the solubility of the molecule as a whole, thereby making the surfactant water-soluble. The molecular weight of the block polymers vary between about 1,000 g/mol and 15,000 g/mol and the polyethylene oxide content may be present in an amount of about 20 weight percent to about 80 weight percent. Such surfactants are marketed under the trade name PLURONICS and, specifically, grades L62 and L64, commercially available from BASF.

The surfactant comprise an anionic surfactant such as, for example, an alkylbenzene sulfonate, α-olefin sulfonate, paraffin sulfonate, alkyl ester sulfonate, alkyl sulfate, alkyl alkoxy sulfate, alkyl sulfonate, alkyl alkoxy carboxylate, monoalkyl phosphate, dialkyl phosphate, sarcosinate, sulfosuccinate, isethionate, taurate, or combinations thereof. Other anionic surfactants that can be suitable for use in the cleaning composition of the present invention include ammonium lauryl sulfate, ammonium laureth sulfate, triethylamine lauryl sulfate, triethylamine laureth sulfate, triethanolamine lauryl sulfate, triethanolamine laureth sulfate, monoethanolamine lauryl sulfate, monoethanolamine laureth sulfate, diethanolamine lauryl sulfate, diethanolamine laureth sulfate, lauric monoglyceride sodium sulfate, sodium lauryl sulfate, sodium laureth sulfate, potassium lauryl sulfate, potassium laureth sulfate, sodium-monoalkyl phosphates, sodium dialkyl phosphates, sodium lauroyl sarcosinate, lauroyl sarcosine, cocoyl sarcosine, ammonium cocyl sulfate, sodium cocyl sulfate, sodium trideceth sulfate, sodium tridecyl sulfate, ammonium trideceth sulfate, ammonium tridecyl sulfate, sodium cocoyl isethionate, disodium laureth sulfosuccinate, sodium methyl oleoyl taurate, sodium laureth carboxylate, sodium trideceth carboxylate, potassium cocyl sulfate, monoethanolamine cocyl sulfate, sodium tridecyl benzene sulfonate, and sodium dodecyl benzene sulfonate.

Additional anionic surfactants can include salts of an alkali metal, an alkali earth metal, ammonia, or a tetraalkylammonium ion and an alkylsulfate, alkylsulfonic acid, or fatty acid. One example of such a material is the sulfate of a fatty alcohol, such as, for example, sodium lauryl sulfate, or sulfate of a polyethoxylated alkanol having the formula: $CH_3(CH_2)_m—(O—CH_2—CH_2)_n—OSO_3M$, wherein M is a cation of an alkali metal, alkaline earth metal, ammonium or polyalkanol ammonium ion or a di- or tri-ethanol or propanol ammonium salt; m is an integer between 6 and 14 inclusive, and may be 11 or 12; and n represents the average degree ethoxylation for the mixture, which is between 1 and 9 inclusive or is preferably 2 moles. A specific example of this type of surfactant is $C_{12}$-$C_{13}$ alcohol polyethylene glycol (ethoxy) ether sulfate. Other examples of anionic surfactants can include, but are not limited to, sulfonates or carboxylates of optionally substituted aromatic or aliphatic alcohol, such as, for example, sulfonates or carboxylates of alkanol, phenol, arylalkanol, alkylphenol, or olefinic alcohol.

Other suitable anionic surfactants may be reaction products of fatty acids esterified with isethionic acid and neutralized with sodium hydroxide. The fatty acids used in these surfactants may be derived from, for example, coconut oil or palm kernel oil. Also suitable are sodium or potassium salts of fatty acid amides of methyl tauride. Still other anionic surfactants may be succinnates, such as, for example, disodium N-octadecylsulfosuccinnate; disodium lauryl sulfosuccinate, diammonium lauryl sulfosuccinate, tetrasodium N-(1,2-dicarboxyethyl)-N-octadecylsulfosuccinnate, and the diamyl, dihexyl, and dioctyl esters of sodium sulfosuccinic acid. Additionally, suitable anionic detersive surfactants include olefin sulfonates having about 10 to about 24 carbon atoms. In addition to the true alkene sulfonates and a proportion of hydroxy-alkanesulfonates, the olefin sulfonates can contain minor amounts of other materials, such as alkene disulfonates depending upon the reaction conditions, proportion of reactants, the nature of the starting olefins and impurities in the olefin stock and side reactions during the sulfonation process.

The surfactant may comprise a cationic surfactant. The cationic surfactant can include a quaternary ammonium compound. Some representative examples of quaternary ammonium compounds include cetyl trimethyl ammonium bromide (also known as CETAB or cetrimonium bromide), cetyl trimethyl ammonium chloride (also known as cetrimonium chloride), myristyl trimethyl ammonium bromide (also known as myrtrimonium bromide or quaternium-13), stearyl dimethyl distearyldimonium chloride, dicetyl dimonium chloride, stearyl octyldimonium methosulfate, dihydrogenated palmoylethyl hydroxyethylmonium methosulfate, isostearyl benzylimidonium chloride, cocoyl benzyl hydroxyethyl imidazolinium chloride, dicetyl dimonium chloride, distearyldimonium chloride, isostearylaminopropalkonium chloride, olealkonium chloride, behentrimonium chloride, and combinations thereof.

Additional examples of suitable cationic surfactants can include, but are not limited to, mono- and di-alkyl chain cationic surfactants. Examples of suitable mono-alkyl chain cationic surfactants include those having one long alkyl chain having between 12 to 22 carbon atoms or from 16 to 22 carbon atoms or a $C_{18}$-$C_{22}$ alkyl group. The remaining groups attached to nitrogen are independently selected from an alkyl group of from 1 to about 4 carbon atoms or an alkoxy, polyoxyalkylene, alkylamido, hydroxyalkyl, aryl or alkylaryl group having up to about 4 carbon atoms. Such mono-alkyl cationic surfactants may include, for example, mono-alkyl quaternary ammonium salts and mono-alkyl amines. Mono-alkyl quaternary ammonium salts may include those having a non-functionalized long alkyl chain. Mono-alkyl amines can include mono-alkyl amidoamines and salts thereof. Other suitable examples of mono-long alkyl quaternized ammonium salt cationic surfactants are behenyl trimethyl ammonium salt, stearyl trimethyl ammonium salt, cetyl trimethyl ammonium salt, and hydrogenated tallow alkyl trimethyl ammonium salt.

Mono-alkyl amines may also be suitable for use in the cleaning compositions described herein as cationic surfactants. Primary, secondary, and tertiary fatty amines may be used. Tertiary amido amines having an alkyl group of from 12 to 22 carbons may be used. Exemplary tertiary amido amines include, but are not limited to, stearamidopropyldimethylamine, stearamidopropyldiethylamine, stear-amidoethyldiethylamine, stearamidoethyldimethylamine, palmitamidopropyldimethylamine, palmitamidopropyldiethylamine, palmitamidoethyldiethylamine, palmitamidoethyldimethylamine, behenamidopropyldimethylamine, behenamidopropyldiethylamine, behenamidoethyldiethylamine, behenamidoethyldimethylamine, arachnidamidopropyldimethylamine, arachidamidopropyldiethylamine, arachidamidoethyldiethylamine, arachidamidoethyldimethylamine, diethylaminoethylstearamide, and combinations thereof.

Additionally, one or more of the amines listed above may be used in combination with acids such as I-glutamic acid, lactic acid, hydrochloric acid, malic acid, succinic acid, acetic acid, fumaric acid, tartaric acid, citric acid, I-glutamic hydrochloride, maleic acid, and mixtures thereof. Mono-alkyl chain cationic surfactants may be used alone, or may be used in combination with other cationic surfactants such as di-alkyl chain cationic surfactants. Suitable di-alkyl chain cationic surfactants can include, for example, dialkyl ($C_{14}$-$C_{18}$) dimethyl ammonium chloride, ditallow alkyl dimethyl ammonium chloride, dihydrogenated tallow alkyl dimethyl ammonium chloride, distearyl dimethyl ammonium chloride, and dicetyl dimethyl ammonium chloride, and combinations thereof.

The surfactant may comprise an amphoteric surfactant. When used in a cleaning composition of the present invention, the amphoteric surfactant may comprise an alkali metal, alkaline earth metal, ammonium salt of an alkyl amphocarboxy glycinate, substituted ammonium salt of an alkyl amphocarboxy glycinate, alkyl amphocarboxypropionate, alkyl amphodipropionate, alkyl amphodiacetate, alkyl amphoglycinate, alkyl amphopropionate, alkyl iminopropionate, alkyl iminodipropionate, alkyl amphopropylsulfonate, or combinations thereof. Some specific examples of amphoteric surfactants include cocoamphoacetate, cocoamphopropionate, cocoamphodiacetate, lauroamphoacetate, lauroamphodiacetate, lauroamphodipropionate, lauroamphodiacetate, cocoamphopropyl sulfonate caproamphodiacetate, caproamphoacetate, caproamphodipropionate, and stearoamphoacetate.

Other exemplary amphoteric surfactants can include, but are not limited to, amphocarboxylates such as alkylamphoacetates (mono or di), alkyl betaines, amidoalkyl betaines, amidoalkyl sultaines, amphophosphates, phosphorylated imidazolines such as phosphobetaines and pyrophosphobetaines, carboxyalkyl alkyl polyamines, alkyliminodipropionates, alkylamphoglycinates (mono or di), alkylamphoproprionates (mono or di), N-alkyl β-aminoproprionic acids, alkylpolyamino carboxylates, and mixtures thereof. In some cases, the amphoteric surfactants may not require a counter-ion. However, in other instances, a counter-ion may be present and, when present, can originate from an alkali metal, an alkaline earth metal, or ammonia.

The surfactant may comprise a zwitterionic surfactant. Examples of zwitterionic surfactants can include, but are not limited to, alkyl betaines, amidoalkyl betaines, sulfobetaine, imidazoline, propinate, or combinations thereof. Some examples of zwitterionic surfactants include cocodimethyl carboxymethyl betaine, lauryl dimethyl carboxymethyl betaine, lauryl dimethyl α-carboxy-ethyl betaine, cetyl dimethyl carboxymethyl betaine, lauryl bis-(2-hydroxy-ethyl) carboxy methyl betaine, stearyl bis-(2-hydroxy-propyl)carboxymethyl betaine, oleyl dimethyl gamma-carboxypropyl betaine, and lauryl bis-(2-hydroxypropyl) α-carboxyethyl betaine, amidopropyl betaines, and alkyl sultaines, such as cocodimethyl sulfopropyl betaine, stearyldimethyl sulfopropyl betaine, lauryl dimethyl sulfoethyl betaine, lauryl bis-(2-hydroxy-ethyl)sulfopropyl betaine, and alkylamidopropylhydroxy sultaines.

The cleaning composition may include not more than about 10 weight percent, not more than about 8 weight percent, not more than about 6 weight percent, not more than about 5 weight percent, not more than about 4 weight percent, not more than about 3 weight percent, not more than about 2 weight percent, not more than about 1 weight percent, not more than about 0.5 weight percent, not more than about 0.25 weight percent of one or more components other than the alkyl 3-hydroxybutyrate, water, and at least one surfactant, based on the total weight of the composition.

The cleaning composition may, however, include one or more additives in addition to the alkyl 3-hydroxybutyrate, water, and surfactant, when present. These additives may be used to impart additional functionality, properties, or characteristics to the final composition. When present, the additives can be selected from the group consisting of co-solvents, complexing agents, dyes, fragrances, perfumes, pH stabilizers, acidifiers, preservatives, defoaming agents, metal protectants, antioxidants, bactericides, fungicides, disinfectants, thickeners, fine or coarse grits, polymers, buffers, delaminates, whiteners, brighteners, solubilizers, builders, corrosion inhibitors, lotions, mineral oils, cloud point modifiers, ion exchangers, sudsing control agents, soil removal agents, softening agents, opacifiers, inert diluents, graying inhibitors, enzymes, and combinations thereof.

The one or more additional components may be present in the cleaning compositions of the present invention in an amount of at least about 0.001 weight percent, at least about 0.005 weight percent, at least about 0.01 weight percent, at least about 0.05 weight percent, at least about 0.10 weight percent, at least about 0.15 weight percent, at least about 0.50 weight percent, at least about 1 weight percent, at least about 1.5 weight percent, at least about 2 weight percent and/or not more than about 40 weight percent, not more than about 35 weight percent, not more than about 30 weight percent, not more than about 25 weight percent, not more than about 20 weight percent, not more than about 15 weight percent, not more than about 10 weight percent, not more than about 8 weight percent, not more than about 5 weight percent, not more than about 4 weight percent, not more than about 3 weight percent, not more than about 2 weight percent, not more than about 1 weight percent, based on the total weight of the composition.

The additives may be present in the cleaning composition in an amount in the range of from about 0.001 to about 40 weight percent, 0.001 to about 35 weight percent, 0.001 to about 30 weight percent, 0.001 to about 25 weight percent, about 0.001 to about 20 weight percent, about 0.001 to about 15 weight percent, about 0.001 to about 10 weight percent, about 0.001 to about 8 weight percent, about 0.001 to about 5 weight percent, about 0.001 to about 4 weight percent, about 0.001 to about 3 weight percent, about 0.001 to about 2 weight percent, about 0.001 to about 1 weight percent, about 0.005 to about 40 weight percent, 0.005 to about 35 weight percent, 0.005 to about 30 weight percent, 0.005 to about 25 weight percent, about 0.005 to about 20 weight percent, about 0.005 to about 15 weight percent, about 0.005 to about 10 weight percent, about 0.005 to about 8 weight percent, about 0.005 to about 5 weight percent, about 0.005 to about 4 weight percent, about 0.005 to about 3 weight percent, about 0.005 to about 2 weight percent, about 0.005 to about 1 weight percent, about 0.01 to about 40 weight percent, 0.01 to about 35 weight percent, 0.01 to about 30 weight percent, 0.01 to about 25 weight percent, about 0.01 to about 20 weight percent, about 0.01 to about 15 weight percent, about 0.01 to about 10 weight percent, about 0.01 to about 8 weight percent, about 0.01 to about 5 weight percent, about 0.01 to about 4 weight percent, about 0.01 to about 3 weight percent, about 0.01 to about 2 weight percent, about 0.01 to about 1 weight percent, about 0.05 to about 40 weight percent, 0.05 to about 35 weight percent, 0.05 to about 30 weight percent, 0.05 to about 25 weight percent, about 0.05 to about 20 weight percent, about 0.05 to about 15 weight percent, about 0.05 to about 10 weight percent, about 0.05 to about 8 weight percent, about 0.05 to about 5 weight percent, about 0.05 to about 4 weight percent, about 0.05 to about 3 weight percent, about 0.05 to about 2 weight percent, about 0.05 to about 1 weight percent, about 0.10 to about 40 weight percent, 0.10 to about 35 weight percent, 0.10 to about 30 weight percent, 0.10 to about 25 weight percent, about 0.10 to about 20 weight percent, about 0.10 to about 15 weight percent, about 0.10 to about 10 weight percent, about 0.10 to about 8 weight percent, about 0.10 to about 5 weight percent, about 0.10 to about 4 weight percent, about 0.10 to about 3 weight percent, about 0.10 to about 2 weight percent, about 0.10 to about 1 weight percent, about 0.15 to about 40 weight percent, 0.15 to about 35 weight percent, 0.15 to about 30 weight percent, 0.15 to about 25 weight percent, about 0.15 to about 20 weight percent, about 0.15 to about 15 weight percent, about 0.15 to about 10 weight percent, about 0.15 to about 8 weight percent, about 0.15 to about 5 weight percent, about 0.15 to about 4 weight percent, about 0.15 to about 3 weight percent, about 0.15 to about 2 weight percent, about 0.15 to about 1 weight percent, about 0.50 to about 40 weight percent, about 0.50 to about 35 weight percent, about 0.50 to about 30 weight percent, about 0.50 to about 25 weight percent, about 0.50 to about 20 weight percent, about 0.50 to about 15 weight percent, about 0.50 to about 10 weight percent, about 0.50 to about 8 weight percent, about 0.50 to about 5 weight percent, about 0.50 to about 4 weight percent, about 0.50 to about 3 weight percent, about 0.50 to about 2 weight percent, about 0.50 to about 1 weight percent, about 1 to about 40 weight percent, 1 to about 35 weight percent, 1 to about 30 weight percent, 1 to about 25 weight percent, about 1 to about 20 weight percent, about 1 to about 15 weight percent, about 1 to about 10 weight percent, about 1 to about 8 weight percent, about 1 to about 5 weight percent, about 1 to about 4 weight percent, about 1 to about 3 weight percent, about 1 to about 2 weight percent, about 1.5 to about 40 weight percent, 1.5 to about 35 weight percent, 1.5 to about 30 weight percent, 1.5 to about 25 weight percent, about 1.5 to about 20 weight percent, about 1.5 to about 15 weight percent, about 1.5 to about 10 weight percent, about 1.5 to about 8 weight percent, about 1.5 to about 5 weight percent, about 1.5 to about 4 weight percent, about 1.5 to about 3 weight percent, about 1.5 to about 2 weight percent, about 2 to about 40 weight percent, 2 to about 35 weight percent, 2 to about 30 weight percent, 2 to about 25 weight percent, about 2 to about 20 weight percent, about 2 to about 15 weight percent, about 2 to about 10 weight percent, about 2 to about 8 weight percent, about 2 to about 5 weight percent, about 2 to about 4 weight percent, about 2 to about 3 weight percent, based on the total weight of the composition.

The ratio, by weight, of alkyl 3-hydroxybutyrate to the total amount of surfactant and additives in the cleaning composition can be at least about 0.002:1, at least about 0.005:1, at least about 0.010:1, at least about 0.050:1, at least about 0.10:1 and/or not more than about 150:1, not more than about 100:1, not more than about 50:1, not more than about 25:1, not more than about 10:1, not more than about 5:1, not more than about 0.5:1, or in the range of from about 0.002:1 to about 150:1, about 0.002:1 to about 100:1, about 0.002:1 to about 50:1, about 0.002:1 to about 25:1, about 0.002:1 to about 10:1, about 0.002 to about 5:1, about 0.002:1 to about 0.5:1, about 0.005:1 to about 150:1, about 0.005:1 to about 100:1, about 0.005:1 to about 50:1, about 0.005:1 to about 25:1, about 0.005:1 to about 10:1, about 0.005:1 to about 5:1, about 0.005:1 to about 0.5:1, about 0.010:1 to about 150:1, about 0.010:1 to about 100:1, about 0.010:1 to about 50:1, about 0.010:1 to about 25:1, about 0.010:1 to about 10:1, about 0.010:1 to about 5:1, about 0.010:1 to about 0.5:1, about 0.050:1 to about 150:1, about 0.050:1 to about 100:1, about 0.050:1 to about 50:1, about 0.050:1 to about 25:1, about 0.050:1 to about 10:1, about 0.050:1 to about 5:1, about 0.050:1 to about 0.5:1, about 0.10:1 to about 150:1, about 0.10:1 to about 100:1, about 0.10:1 to about 50:1, about 0.10:1 to about 25:1, about 0.10:1 to about 10:1, about 0.10:1 to about 5:1, about 0.10 to about 0.5:1.

The cleaning composition may include a co-solvent. When present, the additional organic solvent can be employed in the cleaning composition within one or more of the ranges specified above. Depending, in part, on the specific formulation and/or end use of the cleaning composition, the co-solvent may be used to enhance performance or, in some instances, may simply be included in the composition to aid in coupling a further additive such as, for example, a colorant, a preservative, or a fragrance. The co-solvent may also be added to facilitate coupling of the water and alkyl 3-hydroxybutyrate described above and it can be beneficial, in some cases, that the co-solvent be substantially water soluble.

Suitable co-solvents can be selected from the group consisting of an aliphatic or acyclic hydrocarbon, a halocarbon, a polyol, glycol ether, an ether, an ester of a glycol ether, an alcohol, an ester, a ketone, and combinations thereof. Specific examples of additional solvents include, but are not limited to, methyl acetate, ethyl acetate, methyl propionate, isopropyl acetate, n-propyl acetate, iso-butyl acetate, n-butyl acetate, amyl acetate, methyl amyl acetate, ethyl propionate, n-propyl propionate, n-butyl propionate, methyl iso-butyrate, n-butyrate, isobutyl butyrate, isobutyl isobutyrate, 2-ethylhexyl acetate, ethylene glycol diacetate, acetone, methyl ethyl ketone, methyl n-propyl ketone, methyl isobutyl ketone, methyl iso-amyl ketone, diisobutyl ketone, cyclohexanone, methanol, ethanol, isopropanol, n-propanol, isobutanol, sec-butanol, n-butanol, t-pentyl alcohol, 2,3-dimethyl-2-butanol, cyclohexanol, 2-ethyl hexanol, benzyl alcohol, ethylene glycol, propylene glycol, hexylene glycol, 1,3-propanediol, 2-methyl-1,3-propanediol, diethyleneglycol, dipropyleneglycol, glycerol, formamide, acetamide, N-methylpyrrolidone, N,N-dimethylformamide, N,N-dimethylacetamide, sulfolane, dimethylsulfoxide, gamma-butyrolactone, propylene carbonate, ethylene glycol monopropyl ether, ethylene glycol monobutyl ether, ethylene glycol monohexyl ether, ethylene glycol 2-ethylhexyl ether, ethylene glycol phenyl ether, ethylene glycol butyl ether acetate, diethylene glycol monomethyl ether, diethylene glycol monoethyl ether, diethylene glycol monopropyl ether, diethylene glycol monobutyl ether, diethylene glycol monohexyl ether, diethylene glycol methyl ether acetate, diethylene glycol propyl ether acetate, diethylene glycol butyl ether acetate, triethylene glycol monomethyl ether, triethylene glycol monoethyl ether, triethylene glycol monopropyl ether, triethylene glycol monobutyl ether, propylene glycol monomethyl ether, propylene glycol n-propyl ether, propylene glycol n-butyl ether, propylene glycol methyl ether acetate, dipropylene glycol methyl ether, dipropylene glycol n-propyl ether, dipropylene glycol n-butyl ether, tripropylene glycol methyl ether, tripropylene glycol n-propyl ether, and tripropylene glycol n-butyl ether, ester derivatives thereof, and combinations thereof.

The cleaning composition may include at least one metal chelating agent. Examples of suitable chelating agents include, but are not limited to, triazoles, such as 1,2,4-triazole (TAZ), or triazoles substituted with substituents such as $C_1$-$C_8$ alkyl, amino, thiol, mercapto, imino, carboxy and nitro groups, such as benzotriazole (BTA), tolyltriazole, 5-phenyl-benzotriazole, 5-nitro-benzotriazole, 3-amino-5-mercapto-1,2,4-triazole, 1-amino-1,2,4-triazole, hydroxybenzotriazole, 2-(5-amino-pentyl)-benzotriazole, 1-amino-1,2,3-triazole, 1-amino-5-methyl-1,2,3-triazole, 3-amino-1,2,4-triazole, 3-mercapto-1,2,4-triazole, 3-isopropyl-1,2,4-triazole, 5-phenylthiol-benzotriazole, chloro-benzotriazoles, naphthotriazole, as well as thiazoles, tetrazoles, imidazoles, phosphates, thiols and azines such as 2-mercaptobenzoimidazole (MBI), 2-mercaptobenzothiazole, 4-methyl-2-phenylimidazole, 2-mercaptothiazoline, 5-aminotetrazole (ATA), 5-amino-1,3,4-thiadiazole-2-thiol, 2,4-diamino-6-methyl-1,3,5-triazine, thiazole, triazine, methyltetrazole, 1,3-dimethyl-2-imidazolidinone, 1,5-pentamethylenetetrazole, 1-phenyl-5-mercaptotetrazole, diaminomethyltriazine, mercaptobenzothiazole, imidazoline thione, mercaptobenzimidazole, 4-methyl-4H-1,2,4-triazole-3-thiol, 5-amino-1,3,4-thiadiazole-2-thiol, benzothiazole, tritolyl phosphate, indiazole, ethylenediaminetetraacetic acid (EDTA), 1,2-cyclohexanediamine-N,N,N',N'-tetraacetic acid (CDTA), catechol, gallic acid, thiophenol, nitrilotriacetic acid (NTA), N,N'-bis(2-hydroxyphenyl) ethylenediiminodiacetic acid (HPED), triethylenetetranitrilohexaacetic acid (TTNA), desferrirferrioxamin B,N,N',N"-tris[2-(N-hydroxycarbonyl)ethyl]-1,3,5-benzenetricarboxamide (BAMTPH), ethylenediaminediorthohydroxyphenylacetic acid (EDDHA), ethylenediaminetetramethylenephosphonic acid (EDTMP), α-(hydroxyimino)phosphonic acid, propylenediaminetetraacetic acid (PDTA), hydroxypropylenediaminetetraacetic acid (HPDTA), isoserinediacetic acid (ISDA), β-alaninediacetic acid (β-ADA), hydroxyethanediphosphonic acid, diethylenetriaminetetraacetic acid, diethylenetriaminetetramethylenephosphonic acid, 1-hydroxyethane, 1,1 diphosphonic acid, methylene disphosphonic acid, hydroxymethylene diphosphonic acid, dichloromethylene disphosphonic acid, hydroxycyclohexylmethylene disphosphonic acid, 1-hydroxy-3-aminopropane 1,1 diphosphonic acid, 1-hydroxy-4-aminobutane, 1,1 diphosphonic acid, hydroxyethyleneaminodiacetic acid, hydroxyethylethylenediaminetriacetic acid, diethylenetriaminepentaacetic acid, diethanolglycine, ethanolglycine, citric acid, glycolic acid, glyoxylic acid, acetic acid, lactic acid, phosphonic acid, glucoheptonic acid or tartaric acid, polyacrylates, carbonates, phosphonates, gluconates, dithiocarbamates, and combinations thereof.

Depending on the formulation, the cleaning composition may also include one or more pH adjusting and/or buffering agents to control or maintain the pH of the composition within a certain range. Examples of suitable pH adjusting and/or buffering agents include, but are not limited to, citric acid, lactic acid, glycolic acid, 3-hydroxybutenoic acid, glyceric acid, malic acid, tartaric acid, malonic acid, succinic acid, glutaric acid, adipic acid, maleic acid, fumaric acid and phtalic acid or alkaline compounds such as sodium and potassium carbonate, bicarbonate and hydroxide. Additionally, the composition may include a pH buffering agent such as, for example, weak acids and the alkali metal or ammonium salts thereof such as boric acid, or an organic carboxylic acid such as lactic acid, maleic acid, ascorbic acid, malic acid, benzoic acid, fumaric acid, succinic acid, oxalic acid, malonic acid, mandelic acid, maleic anhydride, citric acid, phthalic acid, and other aliphatic and aromatic carboxylic acids. Suitable ammonium salts can include, for example, tetralkylammonium salts of the above listed weak acids, wherein the tetralkylammonium ion is represented by $[NR_1R_2R_3R_4]^+$, where $R_1$, $R_2$, $R_3$ and $R_4$ may be the same as or different from one another and are selected from the group consisting of $C_1$-$C_6$ straight-chained or branched alkyl (e.g., methyl, ethyl, propyl, butyl, pentyl, hexyl) or $C_6$-$C_{10}$ substituted or unsubstituted aryl groups (e.g., benzyl).

With or without a pH adjusting or buffering agent, the cleaning composition may have a pH of at least about 4, at least about 4.5, at least about 5, at least about 5.5, and/or not more than about 8, not more than about 7.5, not more than about 7, not more than about 6.5, not more than about 6. The pH of the composition can be about 4 to about 8, about 4 to about 7.5, about 4 to about 7, about 4 to about 6.5, about 4 to about 6, about 4.5 to about 8, about 4.5 to about 7.5, about 4.5 to about 7, about 4.5 to about 6.5, about 4.5 to about 6, about 5 to about 8, about 5 to about 7.5, about 5 to about 7, about 5 to about 6.5, about 5 to about 6, about 5.5 to about 8, about 5.5 to about 7.5, about 5.5 to about 7, about 5.5 to about 6.5, about 5.5 to about 6.

The cleaning composition of the present invention can also include at least one fragrance. When present, the fragrance may be incorporated into the composition in an amount of at least about 0.01 weight percent, at least about 0.05 weight percent, at least about 0.10 weight percent, at least about 0.50 weight percent, at least about 1 weight percent and/or not more than about 5 weight percent, not more than about 4 weight percent, not more than about 3 weight percent, not more than about 2 weight percent. The fragrance may be present in the cleaning composition in an amount in the range of from about 0.01 to about 5 weight percent, about 0.01 to about 4 weight percent, about 0.01 to about 3 weight percent, about 0.01 to about 2 weight percent, about 0.05 to about 5 weight percent, about 0.05 to about 4 weight percent, about 0.05 to about 3 weight percent, about 0.05 to about 2 weight percent, about 0.10 to about 5 weight percent, about 0.10 to about 4 weight percent, about 0.10 to about 3 weight percent, about 0.10 to about 2 weight percent, about 0.50 to about 5 weight percent, about 0.50 to about 4 weight percent, about 0.50 to about 3 weight percent, about 0.50 to about 2 weight percent, about 1 to about 5 weight percent, about 1 to about 4 weight percent, about 1 to about 3 weight percent, about 1 to about 2 weight percent, based on the total weight of the composition.

Examples of suitable fragrances can include, but are not limited to, synthetic oils and/or ethanolic natural plant extract. The fragrance can be present in a concentrated form, or as an aqueous solution or in combination with an organic solvent carrier, such as ethanol. Suitable aqueous (e.g. steam-distilled), alcoholic or aqueous alcoholic plant extracts can originate from leaves, fruits, blossoms, roots, rinds or stems of aloe, pineapple, artichoke, arnica, avocado, valerian, bamboo, henbane, birch, stinging nettle, echinacea, ivy, wild angelica, gentian, ferns, pine needles, silver weed, ginseng, broom, oat, rose hip, hamamelis, hay flowers, elderberry, hop, coltsfoot, currants, chamomile, carrots, chestnuts, clover, burr root, cocoanut, cornflower, lime blossom, lily of the valley, marine algae, balm, mistletoe, passion flower, ratanhia, marigold, rosemary, horse chestnut, pink hawthorn, sage, horsetail, yarrow, primrose, nettle, thyme, walnut, wine leaves, and white hawthorn. The fragrance, when present in the cleaning composition, can include one or more of these or other similar components. Alternatively, the cleaning composition of the present invention may be un-fragranced.

The cleaning composition may also include at least one preservative. When present, the preservative may be incorporated into the composition in an amount of at least about 0.001 weight percent, at least about 0.005 weight percent, at least about 0.010 weight percent and/or not more than about 2 weight percent, not more than about 1.5 weight percent, not more than about 1 weight percent. The preservative can be present in the cleaning composition in an amount in the range of from about 0.001 to about 2 weight percent, about 0.001 to about 1.5 weight percent, about 0.001 to about 1 weight percent, about 0.005 to about 2 weight percent, about 0.005 to about 1.5 weight percent, about 0.005 to about 1 weight percent, about 0.010 to about 2 weight percent, about 0.010 to about 1.5 weight percent, about 0.010 to about 1 weight percent, based on the total weight of the composition. Examples of suitable preservatives include, but are not limited to, methylchloroisothiazolinone, methylisothiazolinone, glutaraldehyde, 1,2-benzisothiazoline-3-one, polyhexa-methylenebiguanide hydrochloride, phenoxyethanol, methylparaben, propyl P-hydroxybenzoate (propyl paraben), and sodium benzoate.

The cleaning composition can also include at least one defoaming agent. When present in the cleaning composition, the defoaming agent can be present in an amount of at least about 0.001 weight percent, at least about 0.005 weight percent, at least about 0.010 weight percent and/or not more than about 2 weight percent, not more than about 1.5 weight percent, not more than about 1 weight percent, based on the total weight of the composition. The defoaming agent can be present in the cleaning composition in an amount in the range of from about 0.001 to about 2 weight percent, about 0.001 to about 1.5 weight percent, about 0.001 to about 1 weight percent, about 0.005 to about 2 weight percent, about 0.005 to about 1.5 weight percent, about 0.005 to about 1 weight percent, about 0.010 to about 2 weight percent, about 0.010 to about 1.5 weight percent, about 0.010 to about 1 weight percent, based on the total weight of the composition. Examples of suitable defoaming agents can include, but are not limited to, silica dispersed in polydimethyl siloxane, polydimethyl siloxane, and functionalized polydimethyl siloxanes, hydrocarbon oils and waxes, fatty esters, alcohols, soaps, and ethoxylates, polyethylene glycol esters, alkyl phosphate esters, and combinations thereof.

Additionally, the cleaning composition can include one or more metal protectants, such as, for example, sodium gluconate or sodium glucoheptonate. When present, the metal protectant can be incorporated into the composition in an amount of at least about 0.05 weight percent, at least about 0.10 weight percent, at least about 0.15 weight percent and/or not more than about 5 weight percent, not more than about 4 weight percent, not more than about 3 weight percent. The cleaning composition can include a metal protectant present in an amount in the range of about 0.05 to about 5 weight percent, about 0.05 to about 4 weight percent, about 0.05 to about 3 weight percent, about 0.10 to about 5 weight percent, about 0.10 to about 4 weight percent, about 0.10 to about 3 weight percent, about 0.15 to about 5 weight percent, about 0.15 to about 4 weight percent, about 0.15 to about 3 weight percent, based on the total weight of the composition.

The cleaning composition of the present invention can be dyed or un-dyed. If dyed, the composition may include at least one dye in an amount of at least in an amount of at least about 0.05 weight percent, at least about 0.10 weight percent, at least about 0.50 weight percent and/or not more than about 5 weight percent, not more than about 4 weight percent, not more than about 3 weight percent, not more than about 2 weight percent. The cleaning composition can include a dye present in an amount in the range of about 0.05 to about 5 weight percent, about 0.05 to about 4 weight percent, about 0.05 to about 3 weight percent, about 0.05 to 2 weight percent, about 0.10 to about 5 weight percent, about 0.10 to about 4 weight percent, about 0.10 to about 3 weight percent, about 0.10 to about 2 weight percent, about 0.50 to about 5 weight percent, about 0.50 to about 4 weight percent, about 0.50 to about 3 weight percent, about 0.50 to about 2 weight percent, based on the total weight of the composition.

The dye can be an anionic dye. Examples of suitable anionic dyes can include, but are not limited to, Acid Black 1, Acid Blue 1, Acid Blue 3, Food Blue 5, Acid Blue 7, Acid Blue 9, Acid Blue 74, Acid Orange 3, Acid Orange 6, Acid Orange 7, Acid Orange 10, Acid Red 1, Acid Red 14, Acid Red 18, Acid Red 27, Acid Red 50, Acid Red 52, Acid Red 73, Acid Red 87, Acid Red 88, Acid Red 92, Acid Red 155, Acid Red 180, Acid Violet 9, Acid Violet 43, Acid Violet 49, Acid Yellow 1, Acid Yellow 23, Food Yellow No. 8, D&C Brown No. 1, D&C Green No. 5, D&C Green No. 8, D&C Orange No. 4, D&C Orange No. 10, D&C Red No. 21, D&C Red No. 27, D&C Red No. 33, D&C Violet 2, D&C Yellow No. 7, D&C Yellow No. 8, D&C Yellow No. 10, FD&C Red 2, FD&C Red 40, FD&C Red No. 4, FD&C Yellow No. 6, FD&C Blue 1, Food Black 1, Food Black 2, Disperse Black 9 and Disperse Violet 1 and sodium or potassium salts thereof. Neutral dyes may also be used in the present invention, representative examples being HC Blue No. 2, HC Blue No. 4, HC Blue No. 11, HC Brown No. 1, HC Brown No. 2, HC Green No. 1, HC Orange No. 1, HC Orange No. 2, HC Orange No. 5, HC Red BN, HC Red No. 1, HC Red No. 9, HC Red No. 10, HC Violet BS, HC Violet No. 1, HC Violet No. 2, HC Yellow No. 2, HC Yellow No. 9, HC Yellow No. 10, HC Yellow No. 11, and HC Yellow No. 15. The dye may also be nonionic.

Whether dyed or un-dyed, the cleaning composition may be visually clear, transparent, translucent, or opaque, depending, at least in part, on its particular formulation and/or its ultimate form. For example, the cleaning composition can comprise a visually clear, homogenous solution or a visually clear or transparent microemulsion. Alternatively, the cleaning compositions described herein may comprise an emulsion and may be translucent, cloudy, or even opaque.

The present invention also relates to a method of making a cleaning composition that comprises combining at least one 3-alkyl hydroxybutyrate as described in detail previously with water and an optional surfactant to provide a cleaning mixture. The combining can be carried out at approximately ambient conditions such as, for example, a temperature of at least about 20° C., at least about 25° C., at least about 27° C. and/or not more than about 80° C., not more than about 70° C., not more than about 60° C., not more than about 50° C., not more than about 40° C., not more than about 30° C. The combining temperature can be, for example, in the range of from about 20 to about 80° C., about 20 to about 70° C., about 20 to about 60° C., about 20 to about 50° C., about 20 to about 40° C., about 20 to about 30° C., about 25 to about 80° C., about 25 to about 70° C., about 25 to about 60° C., about 25 to about 50° C., about 25 to about 40° C., about 25 to about 30° C., about 27 to about 80° C., about 27 to about 70° C., about 27 to about 60° C., about 27 to about 50° C., about 27 to about 40° C., about 27 to about 30° C. The temperature at which the components are combined can be within about 40°, within about 20°, within about 10°, or within about 5° of ambient temperature.

The alkyl 3-hydroxybutyrate, water, and optional surfactant, can be combined according to several suitable methods. For example, the combining can include mixing the alkyl 3-hydroxybutyrate with the surfactant to form a homogenous mixture and then adding the homogenous mixture to the water under strong agitation to form a cleaning mixture. In another example, the combining can include mixing the water and surfactant to form an aqueous homogenous mixture and adding the alkyl 3-hydroxybutyrate to the aqueous homogenous mixture to form the cleaning mixture. Alternatively, the water and alkyl 3-hydroxybutyrate can be combined to form a mixture to which the surfactant, when employed, may be added to form the cleaning mixture.

When the composition includes one or more additional components, such as the additives listed above, the additional component may be added to the homogenous mixture prior to, simultaneous with, or subsequent to addition of the alkyl 3-hydroxybutyrate. Preferably, in some case, the additive, when present, may be added after the water, alkyl 3-hydroxybutyrate, and surfactant, if present, have been combined. Depending on the formulation, a pH value of the resulting mixture may be taken and, based on the measured pH, one or more acids, bases, and/or buffers may be added to the mixture in order to obtain a final pH for the cleaning composition in the ranges provided above.

The combining of components to form the cleaning composition may be at least partially carried out using mechanical agitation, especially when the intermediate or final cleaning mixture comprises a solution or micro-emulsion. When a high degree of mixing is desired, the agitation of components can be at least partially carried out using a high speed blender, a high pressure valve homogenizer, a membrane, a micro-structured system, ultra sound, or other device capable of exerting a high shear force to the mixture. Additionally, mixers such as planetary or sigma-blade mixers may also be used. Emulsions may also be formed using the equipment or methods described above, but can typically be made using less intense agitation and lower shear force. Any suitable form of agitation capable of mixing the components with enough intensity to provide the desired end product may be used to form the cleaning mixture.

The resulting cleaning mixture formulated as described above can be in the form of a solution, an emulsion, or a micro-emulsion. When the cleaning composition is a solution, it may be a homogenous solution and may be clear, transparent, translucent, or opaque. When the cleaning composition is an emulsion or micro-emulsion, it may be an oil-in-water emulsion, with droplets of the alkyl 3-hydroxybutyrate being dispersed in the continuous water phase, or a water-in-oil emulsion with droplets of water dispersed in a continuous alkyl 3-hydroxybutyrate phase, although the former is preferred. Micro-emulsions can be clear, transparent, translucent, or opaque, while emulsions can be translucent or opaque. When the cleaning composition is an emulsion or microemulsion, it may include at least one surfactant and/or at least one co-solvent, including those described in detail previously, along with the alkyl 3-hydroxybutyrate, with the alkyl 3-hydroxybutyrate being present, for example, in an amount of at least 4 weight percent, based on the total weight of the composition. When the cleaning composition is a solution, however, it may or may not include a surfactant. If no surfactant is present, the cleaning composition may include the alkyl 3-hydroxybutyrate in an amount of not more than about 4 weight percent, not more than about 3.5 weight percent, not more than about 3 weight percent, or not more than about 2.5 weight percent, based on the total weight of the composition.

Whether a solution, a micro-emulsion, or an emulsion, the cleaning composition of the present invention may be clear, transparent, or opaque. If an emulsion, the composition can be a stable emulsion at storage and use temperatures of at least about 0° F., at least about 15° F., at least about 20° F., at least about 35° F. and/or not more than 80° F., not more than about 75° F., not more than about 70° F., not more than about 65° F. The cleaning compositions of the present invention can be solutions, emulsions, or micro-emulsions stable at storage and use temperatures in the range of from about 0 to about 80° F., about 0 to about 75° F., about 0 to about 70° F., about 0 to about 65° F., about 15 to about 80° F., about 15 to about 75° F., about 15 to about 70° F., about 15 to about 65° F., about 20 to about 80° F., about 20 to about 75° F., about 20 to about 70° F., about 20 to about 65° F., about 35 to about 80° F., about 35 to about 75° F., about 35 to about 70° F., about 35 to about 65° F.

The cleaning mixture resulting from the above-described combining step may be a "ready-to-use" (RTU) formulation or a concentrate. In some cases, RTU formulations can be solutions or micro-emulsions, while concentrates can be micro-emulsions or emulsions. Whether the cleaning composition is a concentrate or an RTU formulation, it may include an alkyl 3-hydroxybutyrate, water, a surfactant, and an additive of the types and/or in the amount listed above.

In one exemplary RTU formulation, the cleaning composition can include an alkyl 3-hydroxybutyrate in an amount of at least about 0.1 weight percent, at least about 0.5 weight percent, at least about 1 weight percent, and/or not more than about 10 weight percent, not more than about 5 weight percent, not more than about 3 weight percent, based on the total weight of the composition. In one example, an RTU formulation can include an alkyl 3-hydroxybutyrate in an amount in the range of from about 0.1 to about 10 weight percent, about 0.1 to about 5 weight percent, about 0.1 to about 3 weight percent, about 0.5 to about 10 weight percent, about 0.5 to about 5 weight percent, about 0.5 to about 3 weight percent, about 1 to about 10 weight percent, about 1 to about 5 weight percent, about 1 to about 3 weight percent, based on the total weight of the composition.

In the same or a different exemplary RTU formulation, water may be present in an amount of at least about 75 weight percent, at least about 80 weight percent, at least about 85 weight percent, at least about 90 weight percent and/or not more than about 99.9 weight percent, not more than about 99 weight percent, not more than about 98 weight percent, not more than about 97 weight percent, not more than about 95 weight percent, or in an amount in the range of from about 75 to about 99.9 weight percent, about 75 to about 99 weight percent, about 75 to about 98 weight percent, about 75 to about 97 weight percent, about 75 to about 95 weight percent, about 80 to about 99.9 weight percent, about 80 to about 99 weight percent, about 80 to about 98 weight percent, about 80 to about 97 weight percent, about 80 to about 95 weight percent, from about 85 to about 99.9 weight percent, about 85 to about 99 weight percent, about 85 to about 98 weight percent, about 85 to about 97 weight percent, about 85 to about 95 weight percent, from about 90 to about 99.9 weight percent, about 90 to about 99 weight percent, about 90 to about 98 weight percent, about 90 to about 97 weight percent, about 90 to about 95 weight percent, based on the total weight of the composition.

In the same or a different exemplary RTU formulation, the ratio of alkyl 3-hydroxybutyrate to water in the cleaning composition can be at least about 0.002:1, at least about 0.003:1, at least about 0.005:1 and/or not more than about 0.040:1, not more than about 0.035:1, not more than about 0.030:1 or in the range of from about 0.002:1 to about 0.040:1, about 0.002:1 to about 0.035:1, about 0.002:1 to about 0.030:1, about 0.003:1 to about 0.040:1, about 0.003:1 to about 0.035:1, about 0.003:1 to about 0.030:1, about 0.005:1 to about 0.040:1, about 0.005:1 to about 0.035:1, about 0.005:1 to about 0.030:1, based on the total weight of said composition.

In the same or a different RTU formulation, the total amount of surfactant and additives present in the cleaning composition can be an amount of at least about 0.1 weight percent, at least about 0.5 weight percent, at least about 1 weight percent, at least about 2 weight percent and/or not more than about 20 weight percent, not more than about 10 weight percent, not more than about 8 weight percent, not more than about 6 weight percent, not more than about 5 weight percent, or an amount in the range of from about 0.1 to about 20 weight percent, about 0.1 to about 10 weight percent, about 0.1 to about 8 weight percent, about 0.1 to about 6 weight percent, 0.1 to about 5 weight percent, about 0.5 to about 20 weight percent, about 0.5 to about 10 weight percent, about 0.5 to about 8 weight percent, about 0.5 to about 6 weight percent, 0.5 to about 5 weight percent, about 1 to about 20 weight percent, about 1 to about 10 weight percent, about 1 to about 8 weight percent, about 1 to about 6 weight percent, 1 to about 5 weight percent, about 2 to about 20 weight percent, about 2 to about 10 weight percent, about 2 to about 8 weight percent, about 2 to about 6 weight percent, 2 to about 5 weight percent, based on the total weight of the composition.

When the cleaning composition (or cleaning mixture) is a concentrate, it can optionally be diluted with one or more diluents, such as, for example, water prior to use as a cleaning composition. Alternatively, the concentrate itself may be used as a cleaning composition.

In one exemplary concentrate formulation, the cleaning composition can include an alkyl 3-hydroxybutyrate in an amount of at least about 0.5 weight percent, at least about 1 weight percent, at least about 5 weight percent and/or not more than about 15 weight percent, not more than about 10 weight percent, based on the total weight of the composition. In one example, an RTU formulation can include an alkyl 3-hydroxybutyrate in an amount in the range of from about 0.5 to about 15 weight percent, about 0.5 to about 10 weight percent, about 1 to about 15 weight percent, about 1 to about 10 weight percent, about 5 to about 15 weight percent, about 5 to about 10 weight percent, based on the total weight of the composition.

In the same or a different exemplary RTU formulation, water may be present in an amount of at least about 30 weight percent, at least about 40 weight percent, at least about 50 weight percent and/or not more than about 90 weight percent, not more than about 80 weight percent, not more than about 75 weight percent, not more than about 65 weight percent, or in an amount in the range of from about 30 to about 90 weight percent, about 30 to about 80 weight percent, about 30 to about 75 weight percent, about 30 to about 65 weight percent, about 40 to about 90 weight percent, about 40 to about 80 weight percent, about 40 to about 75 weight percent, about 40 to about 65 weight percent, about 50 to about 90 weight percent, about 50 to about 80 weight percent, about 50 to about 75 weight percent, about 50 to about 65 weight percent, based on the total weight of the composition.

In the same or a different exemplary concentrate formulation, the ratio of alkyl 3-hydroxybutyrate to water in the cleaning composition can be at least about 0.01:1, at least about 0.03:1, at least about 0.05:1 and/or not more than about 0.50:1, not more than about 0.25:1, not more than about 0.20:1 or in the range of from about 0.01:1 to about 0.50:1, about 0.01:1 to about 0.25:1, about 0.01:1 to about 0.20:1, about 0.03:1 to about 0.50:1, about 0.03:1 to about 0.25:1, about 0.03:1 to about 0.20:1, about 0.05:1 to about 0.50:1, about 0.05:1 to about 0.25:1, about 0.05:1 to about 0.20:1, based on the total weight of said composition.

In the same or a different exemplary concentrate formulation, the total amount of surfactant and additives present in the cleaning mixture can be at least about 2 weight percent, at least about 5 weight percent, at least about 10 weight percent, at least about 20 weight percent, at least about 25 weight percent, at least about 30 weight percent, and/or not more than about 90 weight percent, not more than about 85 weight percent, not more than about 80 weight percent, not more than about 75 weight percent, not more than about 70 weight percent, not more than about 65 weight percent, not more than about 60 weight percent, based on the total weight of the composition.

The total amount of surfactant and additives present can be in the range of from about 2 to about 90 weight percent, about 2 to about 85 weight percent, about 2 to about 80 weight percent, about 2 to about 75 weight percent, about 2 to about 70 weight percent, about 2 to about 65 weight percent, about 2 to about 60 weight percent, about 5 to about 90 weight percent, about 5 to about 85 weight percent, about 5 to about 80 weight percent, about 5 to about 75 weight percent, about 5 to about 70 weight percent, about 5 to about 65 weight percent, about 5 to about 60 weight percent, about 10 to about 90 weight percent, about 10 to about 85 weight percent, about 10 to about 80 weight percent, about 10 to about 75 weight percent, about 10 to about 70 weight percent, about 10 to about 65 weight percent, about 10 to about 60 weight percent, about 20 to about 90 weight percent, about 20 to about 85 weight percent, about 20 to about 80 weight percent, about 20 to about 75 weight percent, about 20 to about 70 weight percent, about 20 to about 65 weight percent, about 20 to about 60 weight percent, about 25 to about 90 weight percent, about 25 to about 85 weight percent, about 25 to about 80 weight percent, about 25 to about 75 weight percent, about 25 to about 70 weight percent, about 25 to about 65 weight percent, about 25 to about 60 weight percent, about 30 to about 90 weight percent, about 30 to about 85 weight percent, about 30 to about 80 weight percent, about 30 to about 75 weight percent, about 30 to about 70 weight percent, about 30 to about 65 weight percent, about 30 to about 60 weight percent, based on the total weight of the composition.

When formulated as a concentrate, the cleaning composition of the present invention may be diluted, using at least one diluent such as, for example water or a liquid comprising water, to form an RTU formulation prior to use. The dilution ratio, by weight, of concentrate to water (or other diluent) can be at least about 1:80, at least about 1:50, at least about 1:20, or at least about 1:10 and/or not more than 10:1, not more than about 8:1, not more than about 5:1, not more than about 3:1, not more than about 2:1, not more than about 1:1. The dilution ratio, by weight, of concentrate to water can be in the range of from about 1:80 to 10:1, about 1:80 to about 8:1, about 1:80 to about 5:1, about 1:80 to about 3:1, about 1:80 to about 2:1, about 1:80 to about 1:1, 1:50 to 10:1, about 1:50 to about 8:1, about 1:50 to about 5:1, about 1:50 to about 3:1, about 1:50 to about 2:1, about 1:50 to about 1:1, about 1:20 to 10:1, about 1:20 to about 8:1, about 1:20 to about 5:1, about 1:20 to about 3:1, about 1:20 to about 2:1, about 1:20 to about 1:1, about 1:10 to 10:1, about 1:10 to about 8:1, about 1:10 to about 5:1, about 1:10 to about 3:1, about 1:10 to about 2:1, about 1:10 to about 1:1.

The present invention also concerns a method of using a cleaning composition that comprises contacting a substrate with a cleaning composition comprising water and at least one alkyl 3-hydroxybutyrate as defined by formula (I), above. The cleaning composition may also include a surfactant and one or more additional components of the types and in the amounts as described in detail previously.

The method of the present invention can be used to clean a wide variety of substrates. As used herein, the term "clean" means to remove at least a portion of one or more undesired materials from a substrate. The substrate being cleaned may present a hard surface at least partially formed of one or more materials selected from the group consisting of metal, glass, plastic, ceramic, porcelain, fiberglass, stone, concrete, plaster, brick, marble, vinyl, natural or composite wood, wall board, or combinations thereof. Some substrates may be composite substrates, formed of two or more different materials, while others may be formed of a single material. At least a portion of the substrate may be coated with a coating material, such as paint or polymeric coating material, different from the material of the underlying portion of the substrate or the portion of the substrate being contacted may be uncoated. Other exemplary surface materials include, but are not limited to, glazed or unglazed tile, porcelain, ceramics, marble, granite, stainless steel, aluminum, polyester, painted and unpainted wood, painted or unpainted, concrete, plaster, no-wax vinyl, linoleum, melamine, FORMICA™, CORIAN™ and chromed substrates.

The type of soil able to be removed from one or more of the above-listed substrates by the cleaning composition is not particularly limited and can include hydrophilic soils, hydrophobic soils, and neutral soils. The soils can be organic or inorganic and can have an acidic, neutral, or basic pH. The soil can comprise, for example, dirt, tar, grease, oil, soap scum, protein, organics, enzymes, and combinations thereof. In contrast to many conventional cleaning compositions, the cleaning compositions of the present invention may have a hydrophobic cleaning efficiency of at least 90 percent achieved in less than 1000 strokes. In general, the cleaning efficiency of a cleaning composition can be defined as the amount of a particular soil removed from a specific type of substrate achieved within a given number of strokes, as visually measured by evaluating the percentage of cleaned surface area. Specific procedures for measuring various cleaning efficiencies are provided in Example 4.

As used herein, the "hydrophobic cleaning efficiency" of a given composition refers to the ability of the composition to remove baked grease from an aluminum substrate according to the baked grease scrub test procedure outlined in Examples 2-4. The hydrophobic cleaning efficiency of a cleaning composition is measured by evaluating the percentage of the surface area of the aluminum substrate that has been cleaned of the baked grease as a result of the baked grease scrub test described in Examples 2-4 after a given number of strokes. Cleaning compositions of the present invention may have a hydrophobic cleaning efficiency of at least about 90 percent, at least about 95 percent, or at least about 99 percent in less than 1,000 strokes and/or can have a hydrophobic cleaning efficiency of at least 90 percent achievable in less than about 950 strokes, less than about 900 strokes, less than about 850 strokes, less than about 800 strokes, less than about 750 strokes, less than about 700 strokes, or less than about 650 strokes measured according to the baked grease scrub test described in Examples 2-4.

Alternatively, or in addition, cleaning compositions according to the present invention may have a hydrophilic cleaning efficiency of at least 90 percent achievable in less than 500 strokes. As used herein, the "hydrophilic cleaning efficiency" of a cleaning composition refers to the ability of the composition to remove soap scum from a painted wall board substrate according to the soap scum scrub test procedure outlined in Examples 2-4. Hydrophilic cleaning efficiency is measured by evaluating the percentage of the surface area of the painted wall board substrate that has been cleaned of the soap scum using the soap scum scrub test procedure described in Examples 2-4 after a given number of strokes. Cleaning compositions of the present invention may have a hydrophilic cleaning efficiency of at least about 90 percent, at least about 95 percent, or at least about 99 percent in less than 500 strokes and/or can have a hydrophobic cleaning efficiency of at least 90 percent achievable in less than about 500 strokes, less than about 450 strokes, less than about 400 strokes, less than about 350 strokes, less than about 300 strokes, less than about 250 strokes, or less than about 200 strokes, less than about 150 strokes, less than about 125 strokes, less than about 100 strokes, measured according to the soap scum scrub test procedure described in Examples 2-4.

In addition to being formulated as an RTU or dilatable concentrate as described above, the cleaning compositions of the present invention may also be formulated as or incorporated into other forms, including, but not limited to, gels, pastes, slurries, foams, wipes, sprays, and aerosols and may be applied to the substrate using any suitable method, such as, for example, wiping, spraying, foaming, soaking, scrubbing, and combinations thereof. When using the cleaning composition of the present invention, at least a portion of the contacting can be carried out by applying at least a portion of the cleaning composition with a spray nozzle, a pressurized spray nozzle, a sponge, a cloth, a wipe, a bucket, a pad, a scrubber, a brush, a hose, or combinations thereof.

As part of the method of cleaning a substrate described herein, at least a portion of the cleaning composition used to contact the substrate may subsequently be removed. In some cases, the cleaning composition, once applied, is allowed to remain on the substrate for some period of time before being removed. This "soak period," measured from the end of the application of the composition to the substrate to the beginning of the removal of at least a portion of the cleaning composition from the substrate, can be of any suitable duration. The length of the soak time can be, for example, at least about 10 seconds, at least about 30 seconds, at least about 1 minute, at least about 5 minutes, and/or not more than about 1 day, not more than about 8 hours, not more than about 4 hours, not more than about 2 hours, not more than about 1 hour, not more than about 30 minutes, not more than about 5 minutes, not more than about 1 minute, not more than about 30 seconds.

The "soak period" can have a length in the range of from about 10 seconds to about 1 day, about 10 seconds to about 8 hours, about 10 seconds to about 4 hours, about 10 seconds to about 2 hours, about 10 seconds to about 1 hour, about 10 seconds to about 30 minutes, about 10 seconds to about 5 minutes, about 10 seconds to about 1 minute, about 10 seconds to about 30 seconds, about 30 seconds to about 1 day, about 30 seconds to about 8 hours, about 30 seconds to about 4 hours, about 30 seconds to about 2 hours, about 30 seconds to about 1 hour, about 30 seconds to about 30 minutes, about 30 seconds to about 5 minutes, about 30 seconds to about 1 minute, about 1 minute to about 1 day, about 1 minute to about 8 hours, about 1 minute to about 4 hours, about 1 minute to about 2 hours, about 1 minute to about 1 hour, about 1 minute to about 30 minutes, about 1 minute to about 5 minutes, about 5 minutes to about 1 day, about 5 minutes to about 8 hours, about 5 minutes to about 4 hours, about 5 minutes to about 2 hours, about 5 minutes to about 1 hour, about 5 minutes to about 30 minutes.

In some cases, there may be no or substantially no soak time. For example, the soak period can be not more than about 10 seconds, not more than about 8 seconds, not more than about 5 seconds, not more than about 2 seconds, not more than about 1 second. Alternatively, the cleaning composition can be applied and removed simultaneously or nearly simultaneously from at least a portion of the substrate.

During removal, at least a portion of the cleaning composition may be rinsed from the substrate using a rinse fluid, applied in the same or a different way than the cleaning composition. The rinse fluid may be an aqueous rinse fluid comprising water or may simply be water. The rinse fluid may also include one or more additional additives and may, in some cases, be mixed with a cleaning composition of the same or different formulation than the cleaning composition being rinsed from the substrate. After being at least partially rinsed, the substrate may again be re-contacted with a cleaning composition having the same or a different composition, which can then be rinsed again in a similar manner. The steps of rinsing and repeating contacting depends on the soil type and level of desired clean and can be repeated at least 2, 3, or 4 times.

The above-described method of cleaning a substrate may be sufficient to remove at least about 60, at least about 70, at least about 75, at least about 80, at least about 85, at least about 90, at least about 95, at least about 97, at least about 99, or substantially all of the soil from the substrate. When a substrate is soiled by two different types of soil, the cleaning composition and method described above may be capable of removing at least about 40, at least about 50, at least about 60, at least about 70, at least about 80, at least about 90 percent of each type of soil. Even when the soils are of different types, such as, for example, hydrophilic and hydrophobic soils, the cleaning compositions of the present invention may be capable of such removal.

The cleaning compositions of the present invention can be domestic or household cleaners, suitable for cleaning a variety of household substrates, or may be specifically formulated for commercial, industrial, and/or institutional use. In some cases, the composition may be usable in all three settings with no loss of performance. The uses of the cleaning compositions described herein are diverse and one or more of the compositions may comprise or be used in a descaling composition, a bathroom cleaner, a toiled cleaner, a glass cleaner, a floor cleaner, a biocidal cleaner, an automotive cleaner, a wood cleaner, a plastic cleaner, a paint stripper, a degreasing composition, a desoiling composition, and/or an all-purpose general cleaner.

The type of substrate being contacted can be located in nearly any type of environment. The substrate may, for example, present a hard surface that can be a domestic surface located in a kitchen, bathroom, laundry room, garage, automobile, basement, outdoor area, and the like. The substrate being cleaned may comprise an industrial and/or institutional substrate associated with, for example, an industrial or institutional kitchen, bathroom, laundering area, or laboratory, and/or the substrate may be a medical substrate, a clinical substrate, or may be a substrate associated with transportation equipment including, for example, automobiles, airplanes, trains, subways, boats, and the like. Examples of specific types of substrates can include, but are not limited to, floors, walls, tiles, windows, sinks, showers, bathtubs, shower curtains, wash basins, drains, dishes, fixtures, fittings, counter tops, cabinets, stove tops, appliance surfaces, such as internal and external surfaces of refrigerators, microwave ovens, convection ovens, freezers, dishwashers, washing machines, and dryers. The substrate may also be associated with furniture or a portion of a transportation device, such as an interior, exterior, or engine surface of a car, boat, plane, or train.

The following examples are intended to be illustrative of the present invention in order to teach one of ordinary skill in the art to make and use the invention and are not intended to limit the scope of the invention in any way.

EXAMPLES

The following Examples describe the preparation of several cleaning formulations, as well as the preparation of several types of soils and the use of those soils to prepare various soiled panels on which the cleaning formulations were tested. As described below, the tests performed included both qualitative and quantitative evaluations of several comparative and inventive compositions.

Example 1

Formulation of Cleaning Compositions

Several cleaning formulations were prepared using the following procedure. First, a base stock solution was prepared by combining water, a nonionic ethoxylated alcohol surfactant (TOMADOL® 901 commercially available from Air Products and Chemicals Incorporated, Allentown, Pa.), a 31.8 w/w percent solution of cocoyl propyl betaine in water, an EDTA complexing agent, and sodium carbonate. The amounts of each of these ingredients in the base stock solution are summarized in Table 1, below.

TABLE 1

Cleaning Formulation Base Stock Solution

| Ingredient | Amount, Parts by Weight |
|---|---|
| Water | 94.50 |
| Surfactant | 0.50 |
| Betaine | 0.25 |
| EDTA | 2.00 |
| Sodium carbonate | 0.50 |
| Total | 97.75 |

Next, 2.25 parts by weight, based on the total cleaning composition, of several inventive and comparative solvents were added to several aliquots of the base stock solution summarized in Table 1 above in order to formulate Comparative Cleaning Compositions A-G and Inventive Cleaning Compositions 1-4. The solvents used to formulate these compositions, along with a few select physical properties of each solvent, are summarized in Table 2, below.

TABLE 2

Summary of Solvents and Select Physical Properties thereof used to Formulate Comparative Cleaning Compositions A-G and Inventive Cleaning Compositions 1-4

| Cleaning Composition | Solvent | Solvent Vapor Pressure at 20° C., torr | Solvent Boiling Point, ° C. |
|---|---|---|---|
| Comparative A | Diethylene Glycol Monoethyl Ether | 0.12 | 198-204 |
| Comparative B | Diethylene Glycol Monobutyl Ether | 0.02 | 227-235 |
| Comparative C | Dipropylene Glycol monobutyl ether | 0.04 | 230 |
| Comparative D | Benzyl Alcohol | 0.076 | 205 |
| Comparative E | Dibasic Ester | 0.20 | 196-225 |
| Comparative F | d-limonene | 1.5 | 176 |
| Comparative G | Ethylene glycol monobutyl ether | 0.60 | 169-172 |
| Inventive 1 | n-butyl 3-hydroxybutyrate | 0.06 | 217 |
| Inventive 2 | i-butyl 3-hydroxybutyrate | 0.08 | 210 |
| Inventive 3 | 2-butyl 3-hydroxybutyrate | 0.098 | 206 |
| Inventive 4 | i-propyl 3-hydroxybutyrate | 0.17 | 169 |

Example 2

Formulation of Soiled Panels

Several soiled panels were created to test the cleaning efficiency of the compositions formulated in Example 1 against various types of dirt on different surfaces.

Soap Scum on Painted Wallboard

A soap scum soil was produced according to the following procedure. First, a hard water sample was prepared by dissolving 10 grams of calcium acetate and 3 grams of magnesium nitrate in 1 liter of deionized water. Next, a soap solution was prepared by dissolving 100 grams of IVORY brand soap (commercially available from Proctor & Gamble Company, Cincinnati, Ohio) in 1 liter of deionized water. Next, the several ingredients, the types and amounts of which are summarized in Table 3 below, were mixed thoroughly and refrigerated to form a synthetic sebum composition.

TABLE 3

Ingredients for Preparation of Synthetic Sebum

| Ingredient | Amount, grams |
| --- | --- |
| Palmitic Acid | 10 |
| Stearic Acid | 5 |
| Coconut oil | 15 |
| Cetyl Esters Wax[2] | 10 |
| Olive oil | 20 |
| Squalene | 5 |
| Cholesterol | 10 |
| Corn oil | 15 |
| Linoleic Acid | 10 |
| Total | 100 |

The soap scum was then prepared by mixing 500 mL of the hard water sample and 50 mL of the soap solution for 15 minutes and then filtering the mixture through #41 filter paper using a Buchner funnel. The residue remaining on the filter was mixed with 2 grams of graphite power in 200 mL of isopropyl alcohol for 10 minutes. Thereafter, 4 grams of the synthetic sebum was added and the mixture was allowed to mix for another 10 minutes.

The resulting soap scum was then applied to several dry wall board samples that had been previously painted with flat white paint according to ASTM D4488. Once applied, the soap scum was allowed to dry on the wall board before testing commenced.

Baked Greasy Soil on Aluminum

A greasy soil was prepared according to the A2 soil procedure outlined in ASTM 4488 by combining 33 grams each of CRISCO-brand vegetable shortening, lard, and vegetable oil, along with 1 gram of graphite powder over a steam bath. The ingredients were blended until smooth and then refrigerated. The greasy soil was then applied to several aluminum Q-panels and baked in an oven at 100° C. for 4 hours, until the grease formed a tough layer unable to be removed by mechanical cleaning.

Tar Soil on Aluminum

A tar soil blend was prepared according to the following procedure. A mixture of Tectyl 506, a viscous oil (commercially available from Petroleum Service Company in Wilkes-Barr, Pa.), and Tectyl 121B, a tar-like petroleum material also available from Petroleum Service Corporation, was formulated in a 10:90 weight ratio. The components were heated during mixing to form a homogenous blend. Once blended, a layer of tar soil having a thickness of approximately 5 mils was applied to several aluminum Q-panels and the panels were allowed to air-dry for a period of 4 hours.

Tar Soil on Vinyl

A standardized tar soil blend was prepared according to the above-described procedure. Once prepared, a 5-mil layer of tar soil was applied to several commercially available vinyl floor tiles and allowed to air dry for a period of 4 hours.

Example 3

Qualitative Scrub Testing of Comparative Cleaning Compositions A-G and Inventive Cleaning Compositions 1-4

The effectiveness of Comparative Cleaning Compositions A-G and Inventive Cleaning Compositions 1-4 were tested on several of the soiled panels prepared in Example 2. During testing, the cleaning compositions were applied with a scrubbing machine constructed by modifying an MEK Double Rub Test machine (commercially available from DJH, Inc. in Oakville, Ontario, Canada or Gardco in Pompano Beach, Fla.) to include a sponge holder instead of a hammer. The sponge holder was formed of a 4-inch aluminum cylinder having a ¾-inch internal diameter, with a holder ring inserted ½ inch from the bottom of the cylinder to hold the sponge in place during cleaning at a fixed distance of ½ inch above the panel being cleaned.

To begin, a clean 1½ inch thick SCOTCH BRITE sponge, commercially available from 3M Company, St. Paul, Minn., was cut into several cylindrical plugs having a height of 1½ inches and a diameter of ¾ inches. A first sponge plug was inserted into the machine holder and the cleaning solution to be tested was poured onto the sponge from the top until the sponge was visually saturated, but not flooded. Scrubbing commenced using the scrubbing machine, using a method similar to the Gardner scrub test with minimal friction between the sponge and surface being cleaned. The scrubbing path was 0.8 inches wide and 2 inches long, with one stroke (two passes) taking 0.4 seconds.

Each of Comparative Cleaning Compositions A-G and Inventive Cleaning Compositions 1-4 were tested on several soiled panels prepared as described in Example 2. Each of the panels were scrubbed until the earlier of 1000 strokes or until the panel was clean. If the scrubbing stopped due to a cleaned panel, the number of strokes required to achieve that result was recorded. Additionally, one the scrubbing was stopped, the operator observed each panel and evaluated its cleanliness using a qualitative rating scale with "10" indicating a completely clean panel and "2" indicating a panel with very little cleaning. When evaluating the cleaning compositions with wall board panels, the effectiveness of the composition was not apparent when the board was wet. Therefore, a set number of scrubs (e.g., 25, 50, 100, etc.) was carried out and the board was allowed to dry before evaluation.

Each of Comparative Cleaning Compositions A-G and Inventive Cleaning Compositions 1-4 were tested on each of the soiled substrates prepared in Example 2. The results of the qualitative analysis are provided in Table 4, below.

TABLE 4

Qualitative Evaluations of Performance of Comparative
Cleaning Compositions A-G and Inventive Cleaning Compositions 1-4
on Various Soiled Panels

| Type of Composition | Cleaning Composition | Grease on Aluminum | | Tar on Aluminum | | Tar on Vinyl | | Soap Scum on Wall board | |
|---|---|---|---|---|---|---|---|---|---|
| | | # Scrubs | Visual Grade | # Scrubs | Visual Grade | # Scrubs | Visual Grade | # Scrubs | Visual Grade |
| Comparative | A | 1000 | 2 | 1000 | 2 | 1000 | 5 | 200 | 2 |
| Comparative | B | 1000 | 7 | 1000 | 3 | 1000 | 9 | 200 | 6 |
| Comparative | C | 1000 | 3 | 700 | 8 | 1000 | 8 | 125 | 9 |
| Comparative | D | 700 | 4 | 800 | 8 | 1000 | 2 | ne | ne |
| Comparative | E | 700 | 6 | 1000 | 8 | 1000 | 9 | 150 | 8 |
| Comparative | F | 600 | 7 | 1000 | 9 | — | — | — | — |
| Comparative | G | 800 | 5 | 1000 | 4 | — | — | 200 | 4 |
| Inventive | 1 | 640 | 10 | 500 | 10 | 1000 | 10 | 100 | 10 |
| Inventive | 2 | 800 | 8 | 700 | 8 | 1000 | 8 | 100 | 10 |
| Inventive | 3 | 1000 | 8 | — | — | — | — | 100 | 8 |
| Inventive | 4 | 1000 | 5 | 1000 | 6 | 1000 | 6 | 200 | 4 |

Notes:
"ne" means not evaluated.

As shown in Table 4 above, for a given type of soil and panel, Inventive Compositions 1-4 tended to remove more soil, as indicated by higher scores, with fewer strokes than Comparative Cleaning Compositions A-G. In addition, as shown by the comparison of the performance of Inventive Compositions 1-4 for all types of soiled surfaces, the effectiveness of cleaning compositions of the present invention is not limited to a particular type of soil or surface. Instead, Inventive Cleaning Compositions 1-4 have the ability to remove both hydrophobic (e.g., tar) and hydrophilic (e.g., soap scum) soils from several different types of surfaces.

Example 4

Quantitative Scrub Testing of Various Comparative and Inventive Cleaning Compositions Additional scrub tests were carried out to quantify the ability of several cleaning compositions to remove different soils from a variety of substrates. During testing, several comparative and inventive cleaning compositions were subjected to scrub tests as described above in Example 3 in order to determine the number of strokes required to remove 90 percent of the soil from each panel, as measured by visual observation. If the panel required more than a specified maximum number of strokes for a given type of panel—i.e., more than 1000 strokes for an aluminum panel and more than 500 strokes for painted wall board—the test was stopped and the maximum number of strokes was recorded.

The above-described procedure was carried out using Comparative Compositions B-H and Inventive Composition 1 to remove baked greasy soil from an aluminum panel (i.e., the baked grease scrub test) and to remove tar from another aluminum panel (i.e., the tar-aluminum scrub test). Additionally, the procedure was carried out using Comparative Compositions B-D and H and Inventive composition 1 to remove soap scum from painted wall board (i.e., the soap scum scrub test). Table 5, below, summarize the results, in number of strokes required to remove at least 90 percent of the soil per visual inspection, for each of the compositions and substrates listed above.

TABLE 5

Number of Strokes Required to Remove
90 percent of Soil from a Panel

| Type of Composition | Cleaning Composition | Soil/Substrate | | |
|---|---|---|---|---|
| | | Grease on Aluminum # Strokes | Tar on Aluminum # Strokes | Soap Scum on Wall Board # Strokes |
| Comparative | A | >1000 | >1000 | >500 |
| Comparative | B | >1000 | >1000 | 300 |
| Comparative | C | >1000 | 700 | 125 |
| Comparative | D | >1000 | 900 | — |
| Comparative | E | >1000 | 900 | — |
| Comparative | F | >1000 | >1000 | — |
| Comparative | G | >1000 | >1000 | >500 |
| Inventive | 1 | 640 | 500 | 100 |

In addition, FIGS. 1-3c show the appearance of each of the panels resulting from these tests, with FIG. 1 illustrating the results for each of the above compositions for removing grease from aluminum, FIG. 2 showing results for each of the above compositions for removing tar from aluminum, and FIGS. 3a-c providing results for each of the above compositions for removing soap scum from painted wall board, with the number of strokes for each trial indicated below the specific run in FIGS. 3a-3c.

Figure 4:
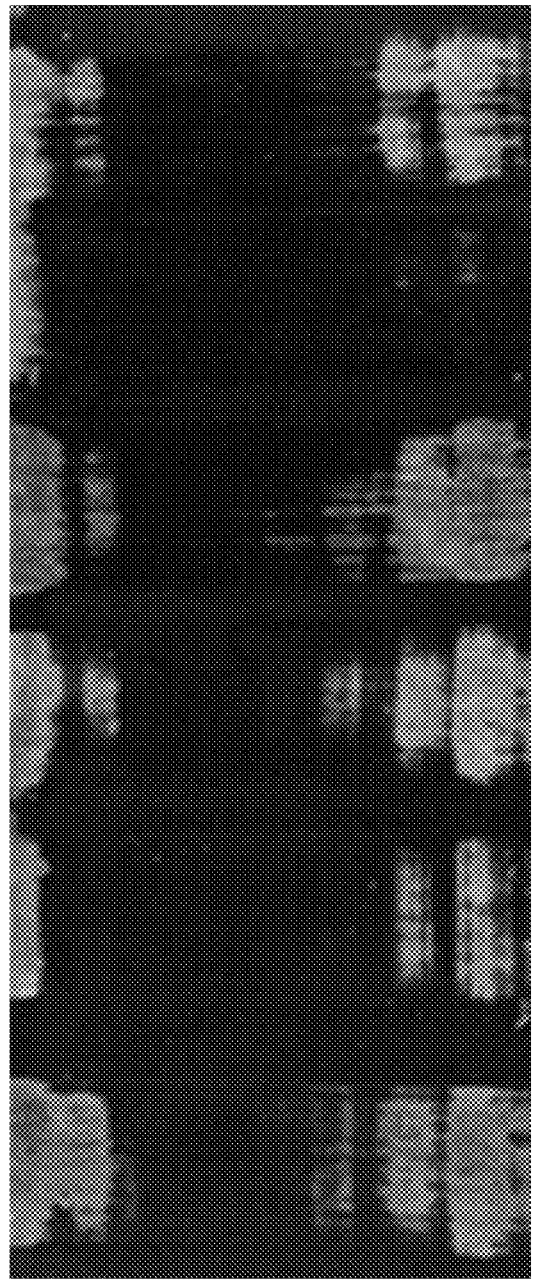
FIG. 4 depicts the results of a tar-vinyl scrub test performed using several comparative and inventive cleaning compositions to remove tar from a vinyl panel using the method described in Example 4.

Additionally, the ability of several compositions to remove tar from a vinyl panel within 1000 strokes was evaluated in a similar manner (i.e., the tar-vinyl scrub test). The panels were prepared according to the procedure described in Example 2, but, due to the difficulty of removing tar from unwaxed vinyl, each of the soiled panel was subjected to 1000 strokes using the apparatus and method described in Example 3. After 1000 strokes, the test was stopped and the results were evaluated qualitatively in a similar manner as described in Example 3, with the cleaning ability of the composition being rated visually on a scale of 1 to 10, with a "1" indicating a low level or no cleaning and a "10" indicating nearly or completely clean. The ratings assigned to each composition are summarized in Table 6, below, with the results of the test being shown in FIG. 4.

TABLE 6

Evaluation of Ability of Comparative and Inventive Cleaning Compositions to Remove Tar from Vinyl at 1,000 Strokes

| Type of Composition | Cleaning Composition | Rating |
|---|---|---|
| Comparative | A | 3 |
| Comparative | B | 3 |
| Comparative | C | 3 |
| Comparative | D | 5 |
| Comparative | E | 2 |
| Comparative | F | 6 |
| Inventive | 1 | 7 |
| Inventive | 4 | 4 |

Example 5

Interaction of Various Cleaning Solvents with Vinyl Flooring

Several tests were also conducted to determine the interaction of several cleaning solvents used to formulate the cleaning compositions in Example 1 with the protective wax layer found on many types of vinyl flooring. Vinyl flooring is typically waxed and buffed to a high gloss and effectively removing soil from such flooring, especially soils like tar, is challenging because the dirt must be removed without harming the wax layer. To test the effect of several of the comparative and inventive solvents, in neat form, on the wax layer of a vinyl floor tile, the following procedure was carried out.

An aqueous wax, commercially available from Zep, was mixed with a small amount of fine graphite powder and applied to a vinyl floor tile with a substantially uniform thickness. The wax layer was dried, buffed with a cloth, and then allowed to dry overnight. After that, a second coat of the black-tinted wax was applied to the tile and was again dried, buffed, and allowed to dry overnight. A scrub test, as described above in Example 3 was then run on several of the dried, waxed tiles, using the following solvents, in neat form: n-butyl 3-hydroxybutyrate (NBHB), isopropyl 3-hydroxybutyrate (IPHB), acetone, propylene glycol butyl ether (PnB), propylene glycol propyl ether (PnP), d-limonene, dipropylene glycol methyl ether (DPM), dibasic ester (DBE), and ethylene glycol butyl ether (EB). The results are shown in FIG. 5.

Figure 5:
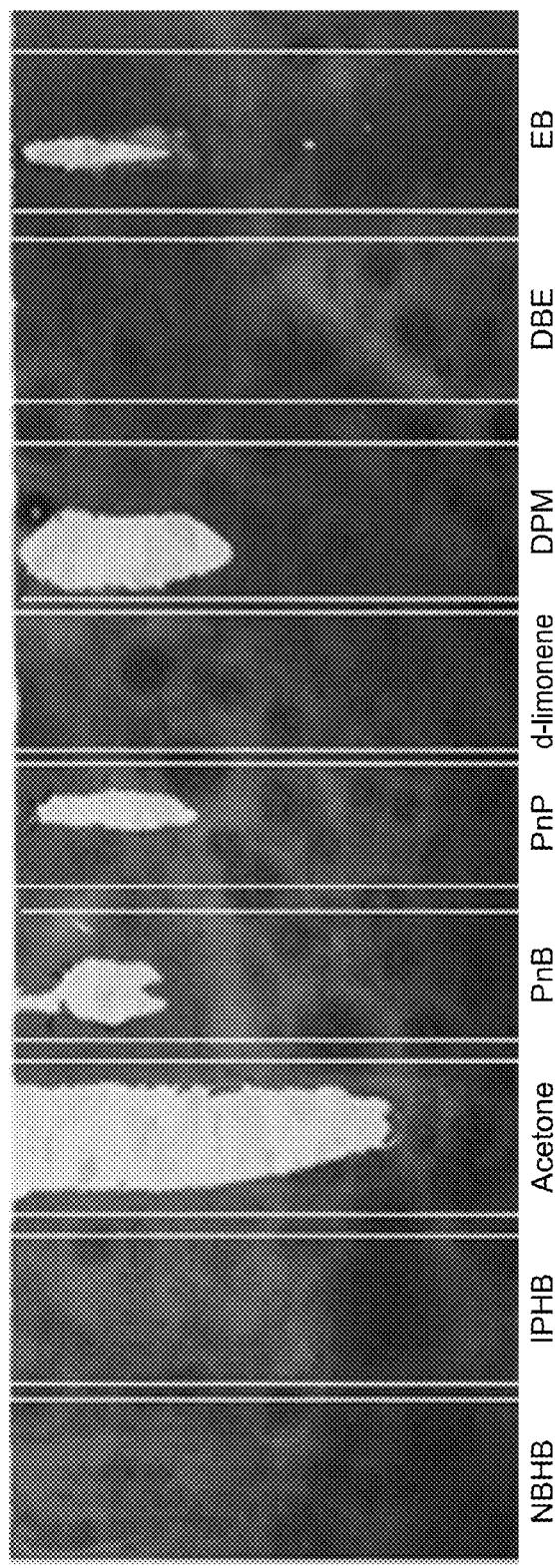
FIG. 5 depicts the results of a wax scrub test performed using several different solvents on a vinyl floor tile coated with black-tinted wax as described in Example 5 to demonstrate the interaction of each solvent with the wax coating.

As shown in FIG. 5, four of the solvents—n-butyl 3-hydroxybutyrate, isopropyl 3-hydroxybutyrate, d-limonene, and dibasic ester—did not remove the wax layer after 1000 strokes. The remaining solvents removed at least a portion of the wax layer, as indicated by the white streaks of underlying vinyl visible through the black-tinted wax. The number of strokes required to achieve the results shown in FIG. 5 for each of the solvents tested are summarized in Table 7, below.

TABLE 7

Number of Strokes for Several Solvents in Wax Test Shown in FIG. 5

| Solvent | # Strokes |
|---|---|
| NBHB | 1000 |
| IPHB | 1000 |
| Acetone | 50 |
| PnB | 500 |
| PnP | 500 |
| d-limonene | 1000 |

TABLE 7-continued

Number of Strokes for Several Solvents in Wax Test Shown in FIG. 5

| Solvent | # Strokes |
|---|---|
| DPM | 1000 |
| DBE | 1000 |
| EB | 900 |

The preferred forms of the invention described above are to be used as illustration only, and should not be used in a limiting sense to interpret the scope of the present invention. Obvious modifications to the exemplary one embodiment, set forth above, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

We claim:

1. A method for cleaning a substrate comprising: contacting a substrate with a cleaning composition comprising water and at least one alkyl 3-hydroxybutyrate defined by the following formula:

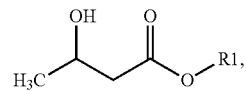

wherein R1 is an alkyl group having at least 3 and not more than 5 carbon atoms; and subsequent to said contacting, removing at least a portion of said cleaning composition from said substrate.

2. The method of claim 1, wherein R1 is an alkyl group having three or four carbon atoms.

3. The method of claim 1, wherein R1 is an alkyl group selected from the group consisting of isobutyl, n-butyl, and sec-butyl.

4. The method of claim 1, wherein R1 is a n-butyl group.

5. The method of claim 1, wherein said alkyl 3-hydroxybutyrate has a vapor pressure of less than 0.10 torr measured at 20° C.

6. The method of claim 5, wherein said alkyl 3-hydroxybutyrate has a boiling point of at least 210° C.

7. The method of claim 5, wherein said cleaning composition comprises not more than 10 weight percent of compounds having a vapor pressure greater than 0.10 torr measured at 20° C., based on the total weight of said composition.

8. The method of claim 1, wherein ratio, by weight, of said alkyl 3-hydroxybutyrate to said water in said cleaning composition is in the range of from about 0.001:1 to about 0.50:1.

9. The method of claim 1, wherein said cleaning composition comprises not more than about 8 weight percent of components other that said water and said alkyl 3-hydroxybutyrate.

10. The method of claim 1, wherein said cleaning composition further comprises at least one surfactant having a hydrophilic-lipophilic balance (HLB) value in the range of from about 4 to about 17, wherein said alkyl 3-hydroxybutyrate is present in said cleaning composition in an amount in the range of from about 0.1 to about 50 weight percent, wherein said water is present in said composition in an amount in the range of from about 30 to about 99.9 weight percent, wherein said surfactant is present in an amount in the range of from about 0.1 to about 15 weight percent, based on the total weight of said composition.

11. The method of claim 10, wherein the ratio, by weight, of said alkyl 3-hydroxybutyrate to the total amount of said water and said surfactant in said cleaning composition is in the range of from about 0.001:1 to about 0.25:1.

12. The method of claim 10, wherein the ratio, by weight, of said alkyl 3-hydroxybutyrate to said surfactant in said cleaning composition is in the range of from about 0.05:1 to about 50:1.

13. The method of claim 10, wherein said cleaning composition comprises less than 10 percent of components other than said alkyl 3-hydroxybutyrate, said water, and said surfactant.

14. The method of claim 1, further comprising prior to said contacting, adding water to a concentrated cleaning composition to thereby form a diluted cleaning composition, wherein said cleaning composition used to contact said substrate comprises at least a portion of said diluted cleaning composition.

15. The method of claim 14, wherein the ratio, by weight, of said alkyl 3-hydroxybutyrate to said water in said concentrated cleaning composition is in the range of from about 0.01:1 to 0.50:1 and wherein the ratio, by weight, of said alkyl 3-hydroxybutyrate to said water in said diluted cleaning composition is in the range of from about 0.001:1 to about 0.035:1.

16. The method of claim 1, wherein said cleaning composition has a hydrophobic cleaning efficiency of at least 90 percent achieved in less than 1,000 strokes.

17. The method of claim 16, wherein said cleaning composition has a hydrophilic cleaning efficiency of at least 90 percent achieved in less than 500 strokes.

18. The method of claim 1, wherein said removing includes contacting at least a portion of said substrate with a rinse fluid, wherein said rinse fluid comprises water.

19. The method of claim 1, wherein said cleaning composition is in the form of a solution, an emulsion, a microemulsion, a gel, a paste, a slurry, a foam, or an aerosol.

20. The method of claim 1, wherein said substrate comprises a material selected from the group consisting of glass, metal, plastic, ceramic, porcelain, fiberglass, leather, stone, concrete, plaster, brick, marble, vinyl, wood, wallboard, carpet, fabric, nonwoven material, and combinations thereof.

21. The method of claim 1, wherein said substrate presents a hard surface.

22. The method of claim 21, wherein said hard surface is a kitchen, a bathroom, a window, a wall, a floor, an appliance, a clinical, a laboratory, or an automotive surface.

23. The method of claim 1, wherein said removing removes said cleaning composition from said substrate.

24. The method of claim 1, wherein said removing is carried out not more than 10 seconds after said contacting.

25. The method of claim 1, further comprising, allowing said cleaning composition to remain on said substrate for a soak period after said contacting and before said removing.

26. The method of claim 25, wherein said soak period is at least 10 seconds and not more than 1 day.

27. The method of claim 1, wherein said removing comprises applying a rinse fluid to said substrate.

28. The method of claim 27, further comprising re-contacting said substrate with said cleaning composition after said applying of said rinse fluid.

29. The method of claim 1, wherein prior to said contacting, an initial quantity of soil is present on said substrate and wherein after said removing at least 60 percent of said soil has been removed from said substrate.

* * * * *